(12) United States Patent
DeWeerd et al.

(10) Patent No.: US 6,351,223 B1
(45) Date of Patent: Feb. 26, 2002

(54) SYSTEM AND METHOD FOR READING AND TRANSMITTING WATER METER DATA UTILIZING RF SIGNALS

(75) Inventors: Andrew W. DeWeerd, Seminole; Christopher J. May; Steven C. Tilka, both of Largo, all of FL (US)

(73) Assignee: Midway Services, Inc., Clearwater, FL (US)

( * ) Notice: Subject to any disclaimer, the term of this patent is extended or adjusted under 35 U.S.C. 154(b) by 0 days.

(21) Appl. No.: 09/241,042

(22) Filed: Feb. 1, 1999

(51) Int. Cl.[7] .............................................. G08B 23/00
(52) U.S. Cl. ........................... 340/870.03; 340/870.02; 340/637; 324/110; 375/130; 375/138
(58) Field of Search ....................... 340/870.02, 870.03, 340/10.31, 825.52, 637, 539; 324/157, 110; 375/130, 138

(56) References Cited

U.S. PATENT DOCUMENTS

| | | | |
|---|---|---|---|
| 3,688,271 A | 8/1972 | Rouse .................... | 340/870.03 |
| 4,254,472 A | 3/1981 | Juengel et al. .............. | 702/188 |
| 4,713,837 A | 12/1987 | Gordon .................. | 379/106.07 |
| 4,940,976 A | 7/1990 | Gastouniotis et al. .. | 340/870.02 |
| 5,056,107 A | 10/1991 | Johnson et al. ............. | 375/138 |
| 5,432,507 A | 7/1995 | Mussino et al. ........ | 340/870.03 |
| 5,448,230 A | 9/1995 | Schanker et al. ...... | 340/870.03 |
| 5,491,473 A | 2/1996 | Gilbert ................... | 340/870.01 |
| 5,493,287 A | 2/1996 | Bane ..................... | 340/825.52 |
| 5,495,239 A | 2/1996 | Ouellette ............... | 340/870.02 |
| 5,553,094 A | 9/1996 | Johnson et al. ............. | 375/130 |

*Primary Examiner*—Michael Horabik
*Assistant Examiner*—Albert K. Wong
(74) *Attorney, Agent, or Firm*—Larson & Larson, PA; James E. Larson

(57) ABSTRACT

A network of fixed RF transmitter modules, an RF repeater module and an RF collector module are located within a multi-unit facility for collecting water usage data from a plurality of water meters associated with the units within the facility and for uploading to a central billing center. Each water meter is coupled to a single RF transmitter module. Each RF transmitter module reads the water meter multiple times per day and transmits the data over a 418 MHZ carrier. One of a plurality of transceivers coupled to the RF repeater module receives the data and directs it to a storage medium in the RF repeater module. The RF repeater module temporarily holds the data and then repeats it on the RF carrier. The RF collector module receives the data through a transceiver coupled thereto. The data is stored in a storage medium of the RF collector module for retrieval by the central billing center.

38 Claims, 31 Drawing Sheets

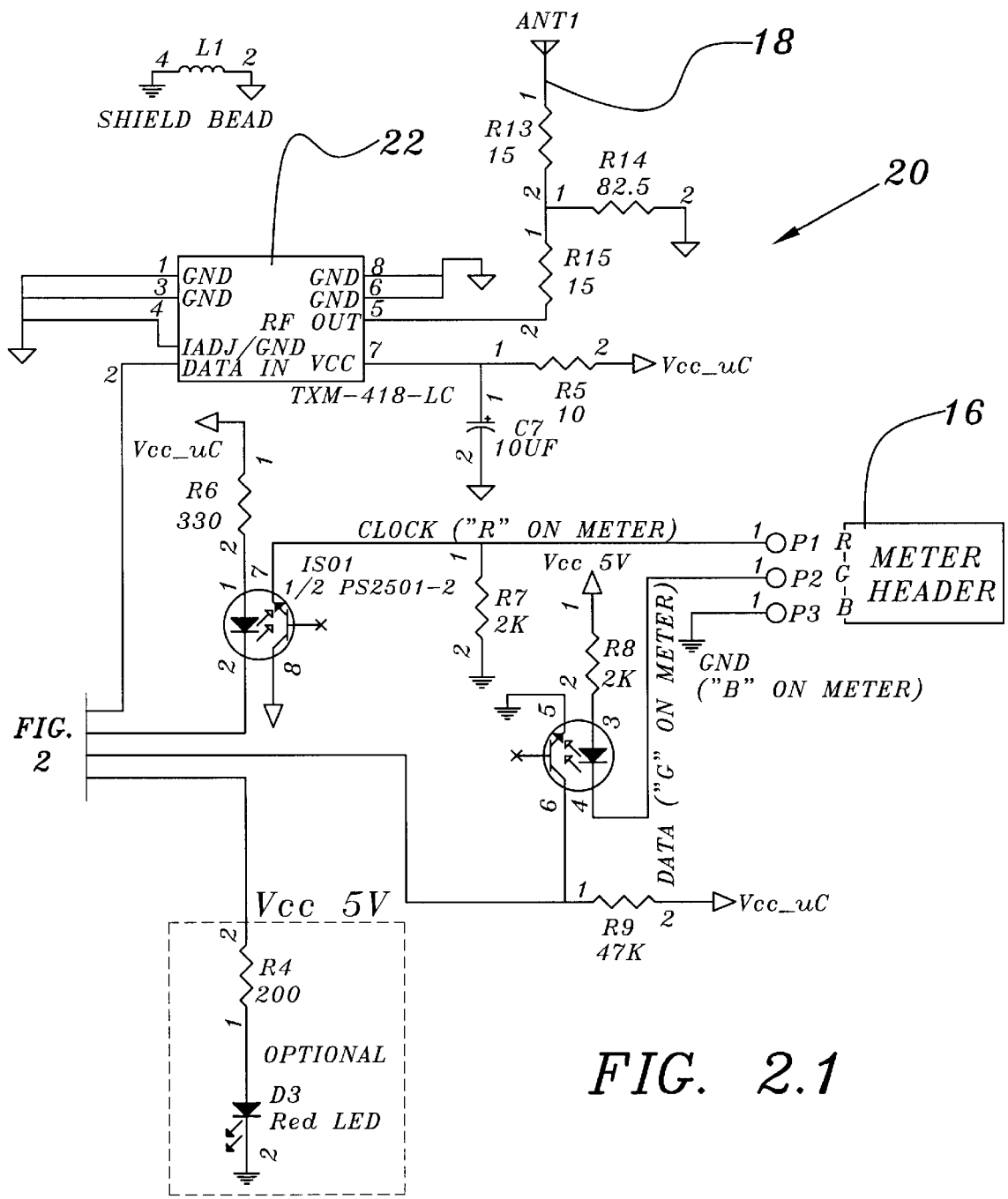
FIG. 2.1

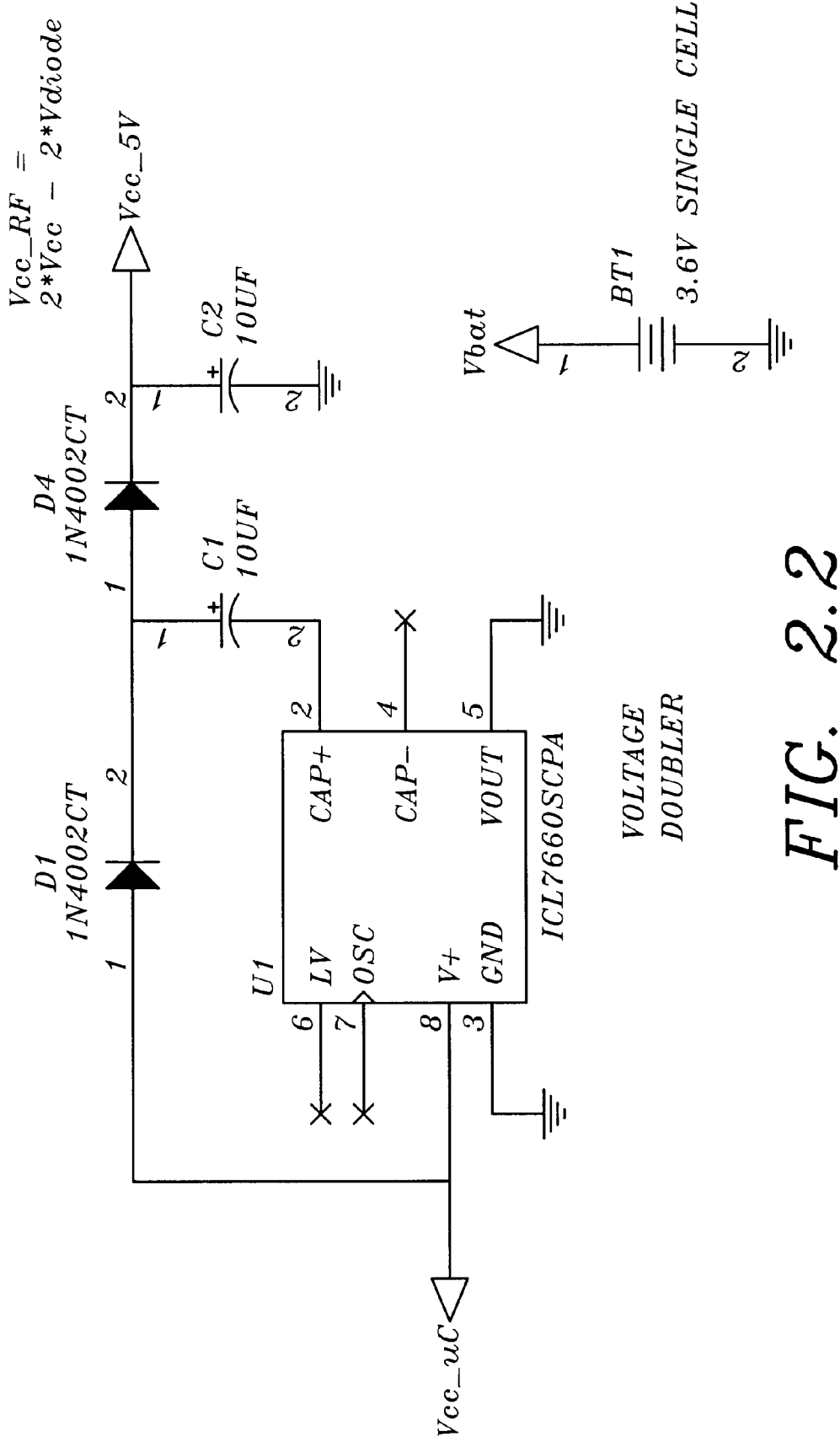
FIG. 2.2
VOLTAGE DOUBLER

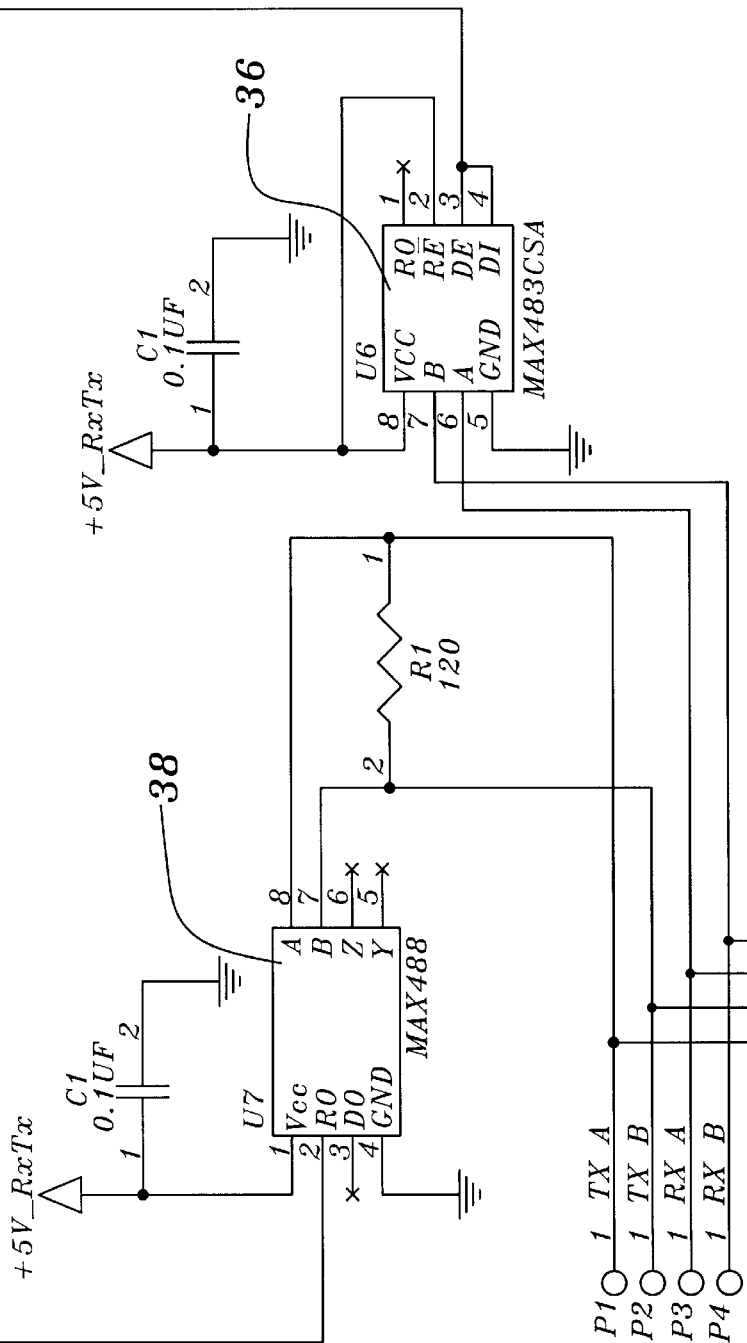

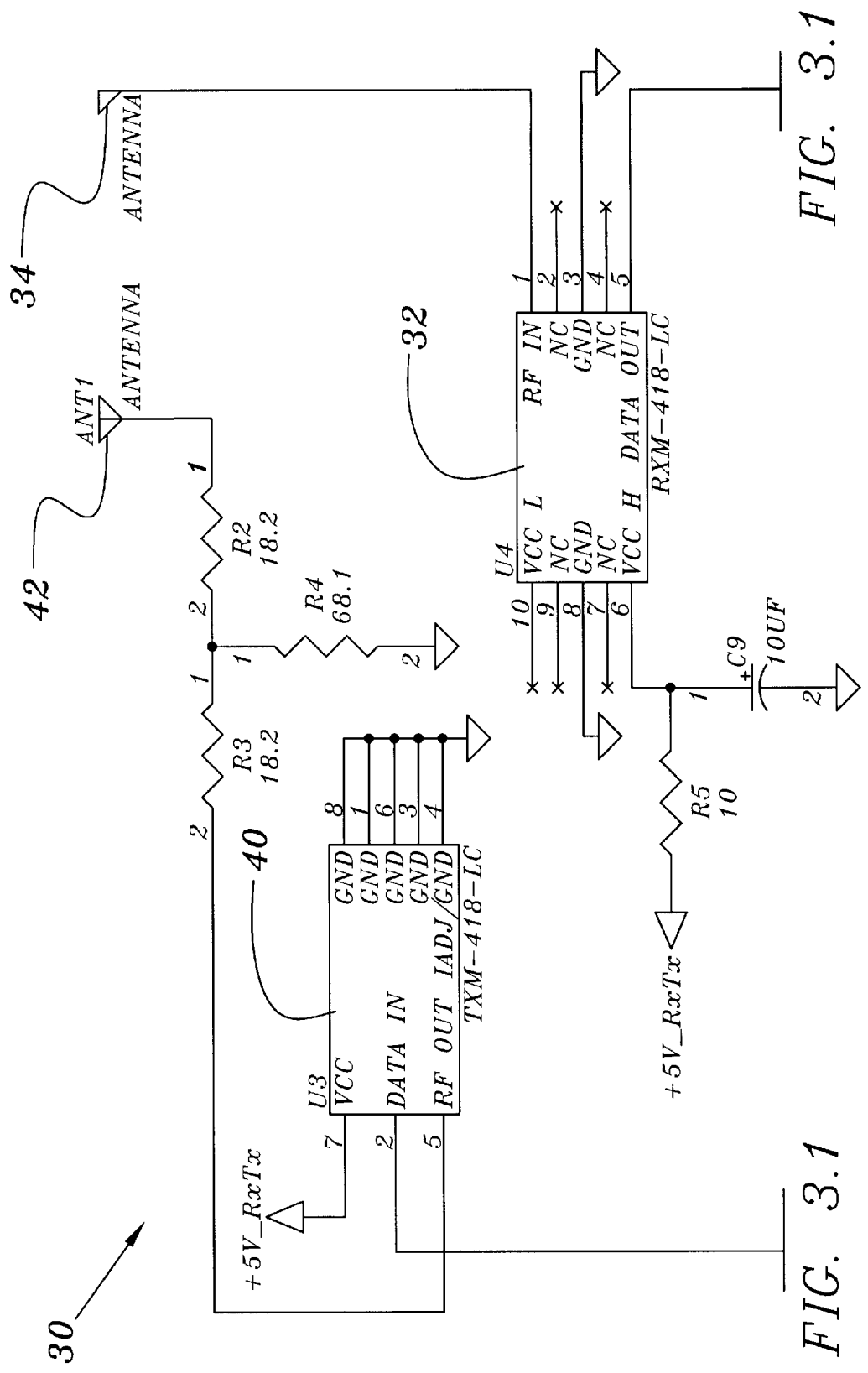

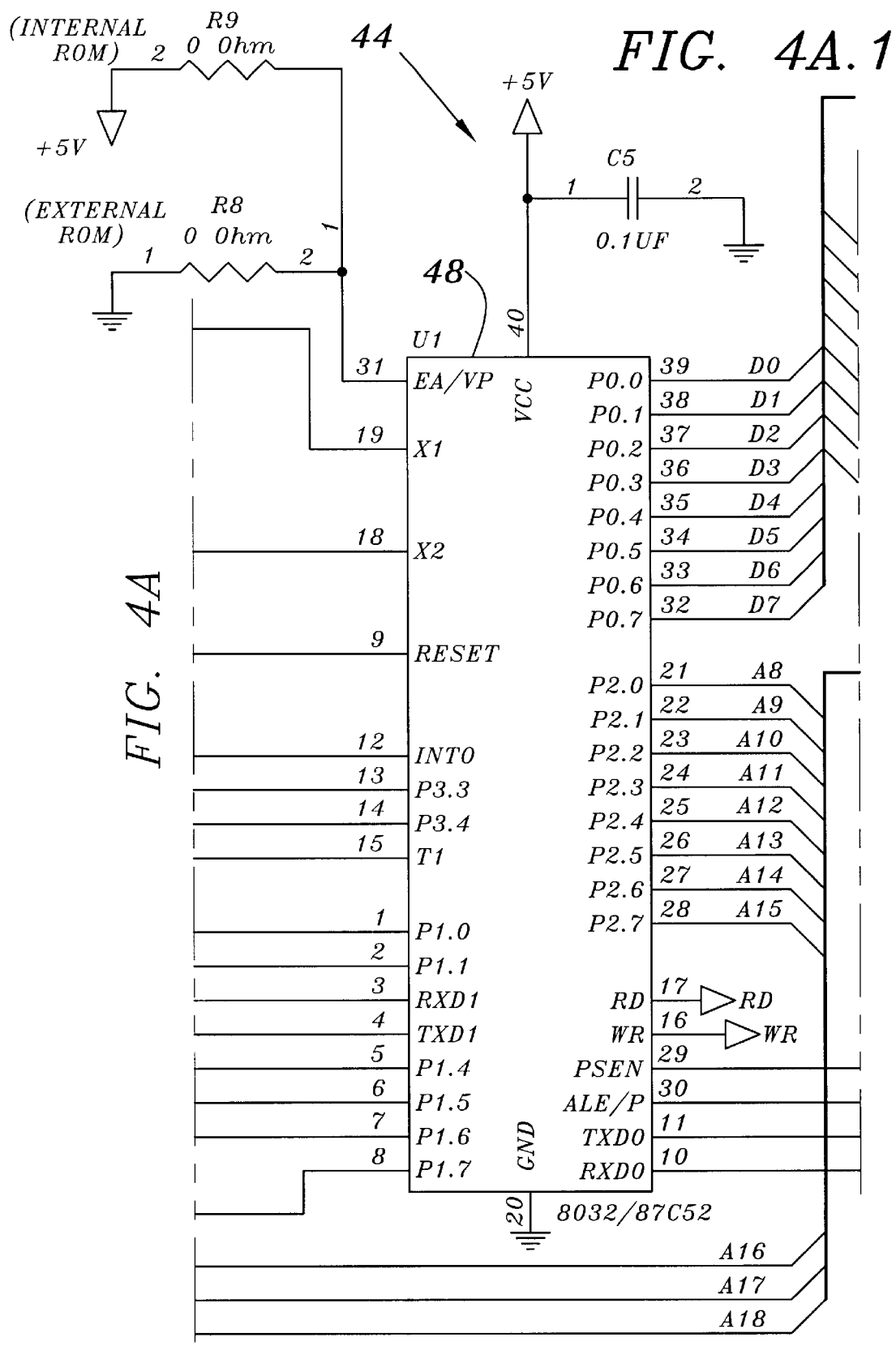
FIG. 4A.1

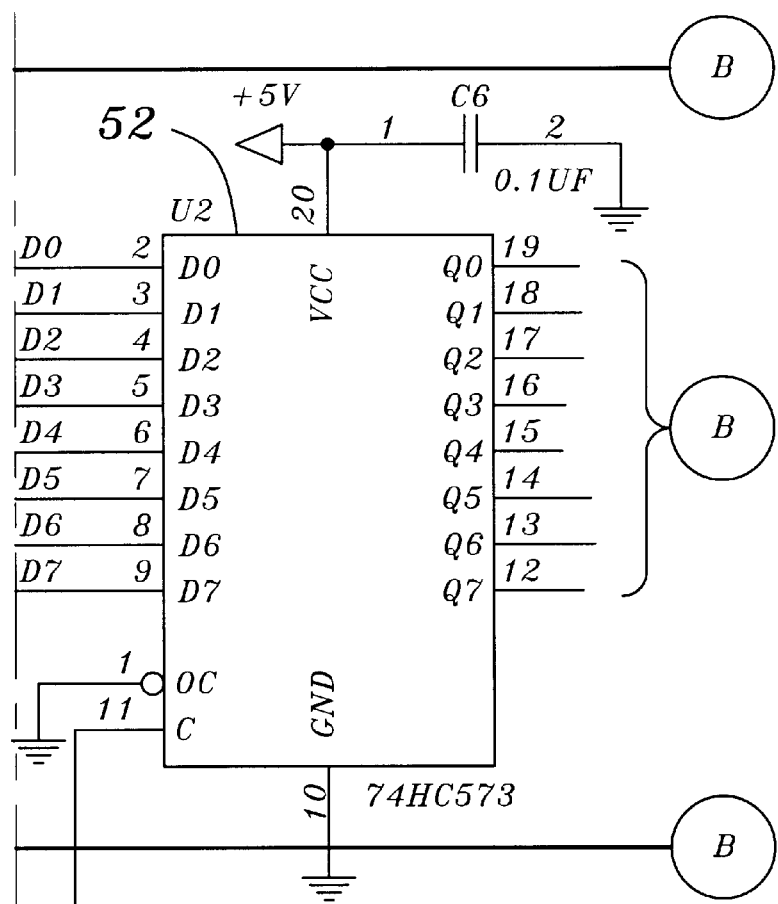
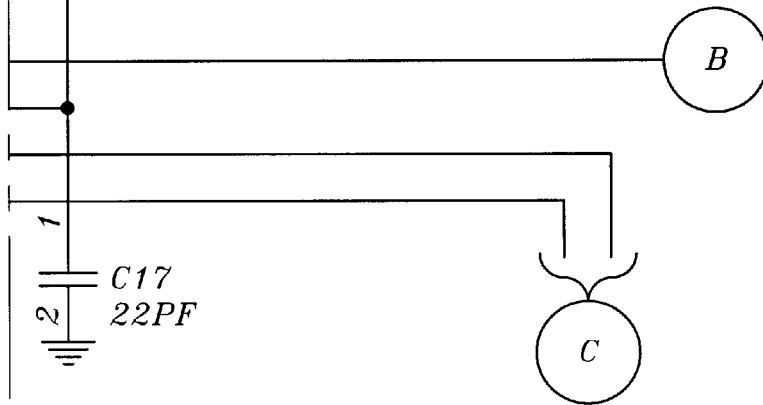
FIG. 4A.1
FIG. 4A.2

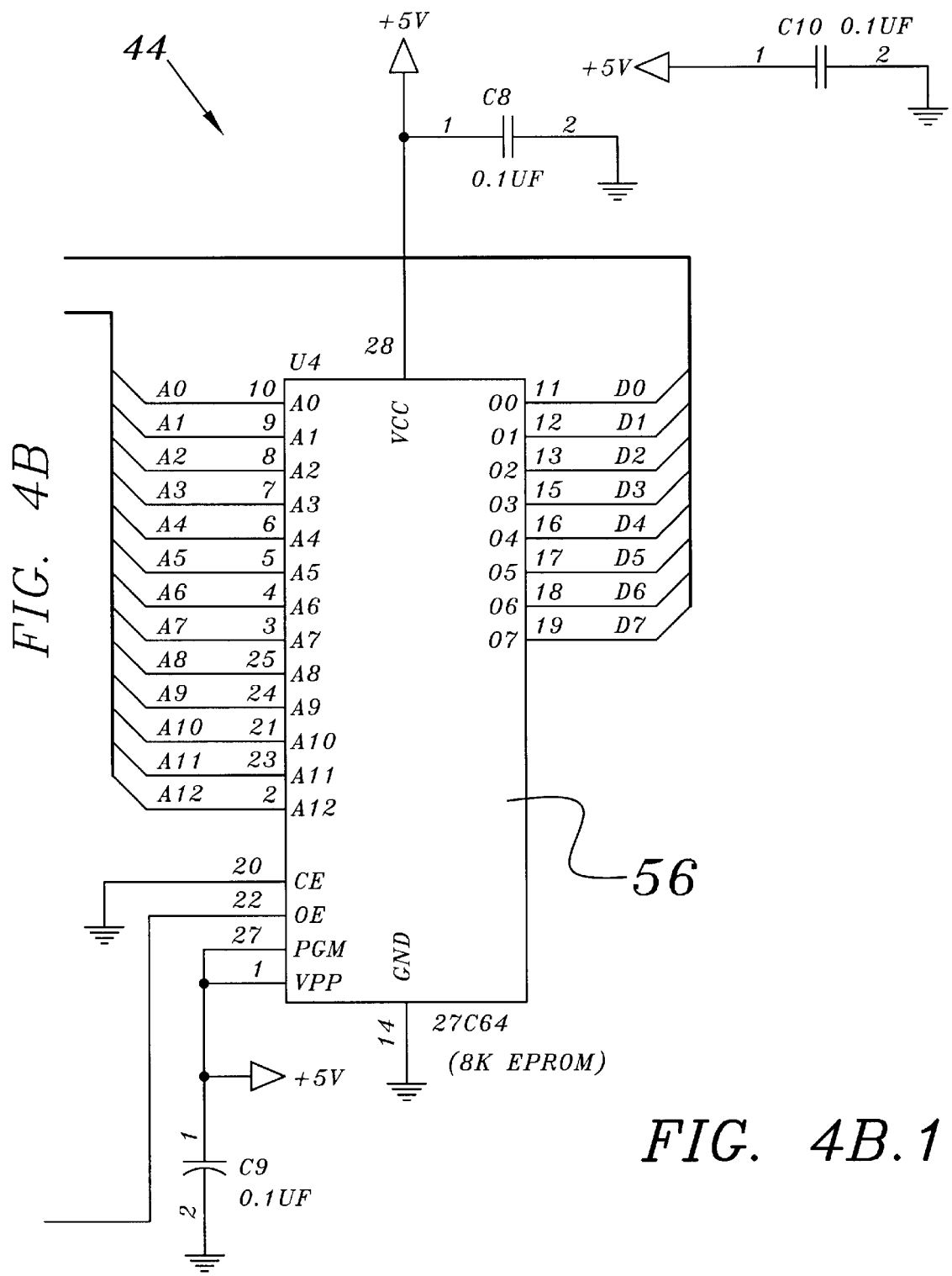
FIG. 4B.1

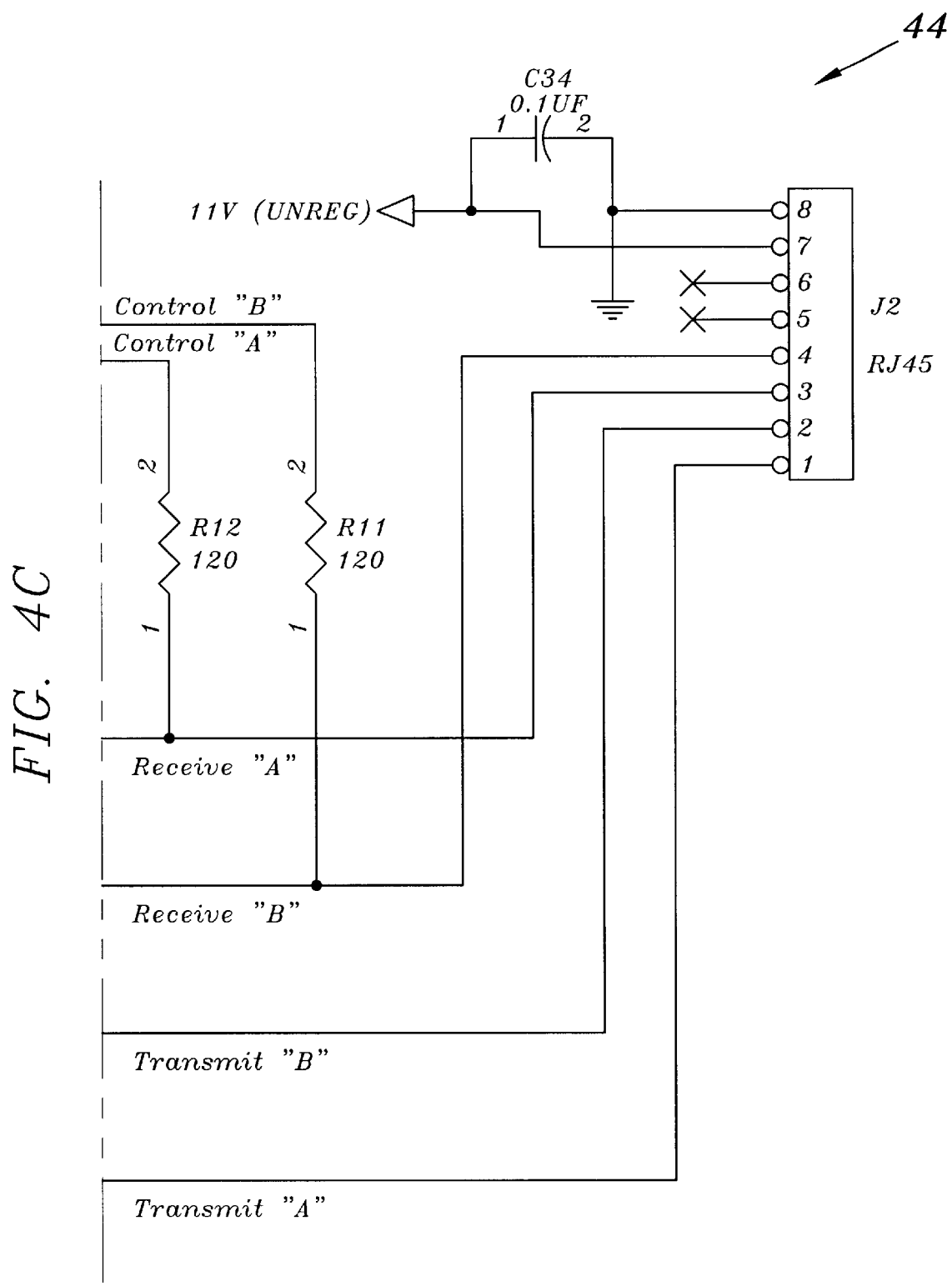
FIG. 4C.1

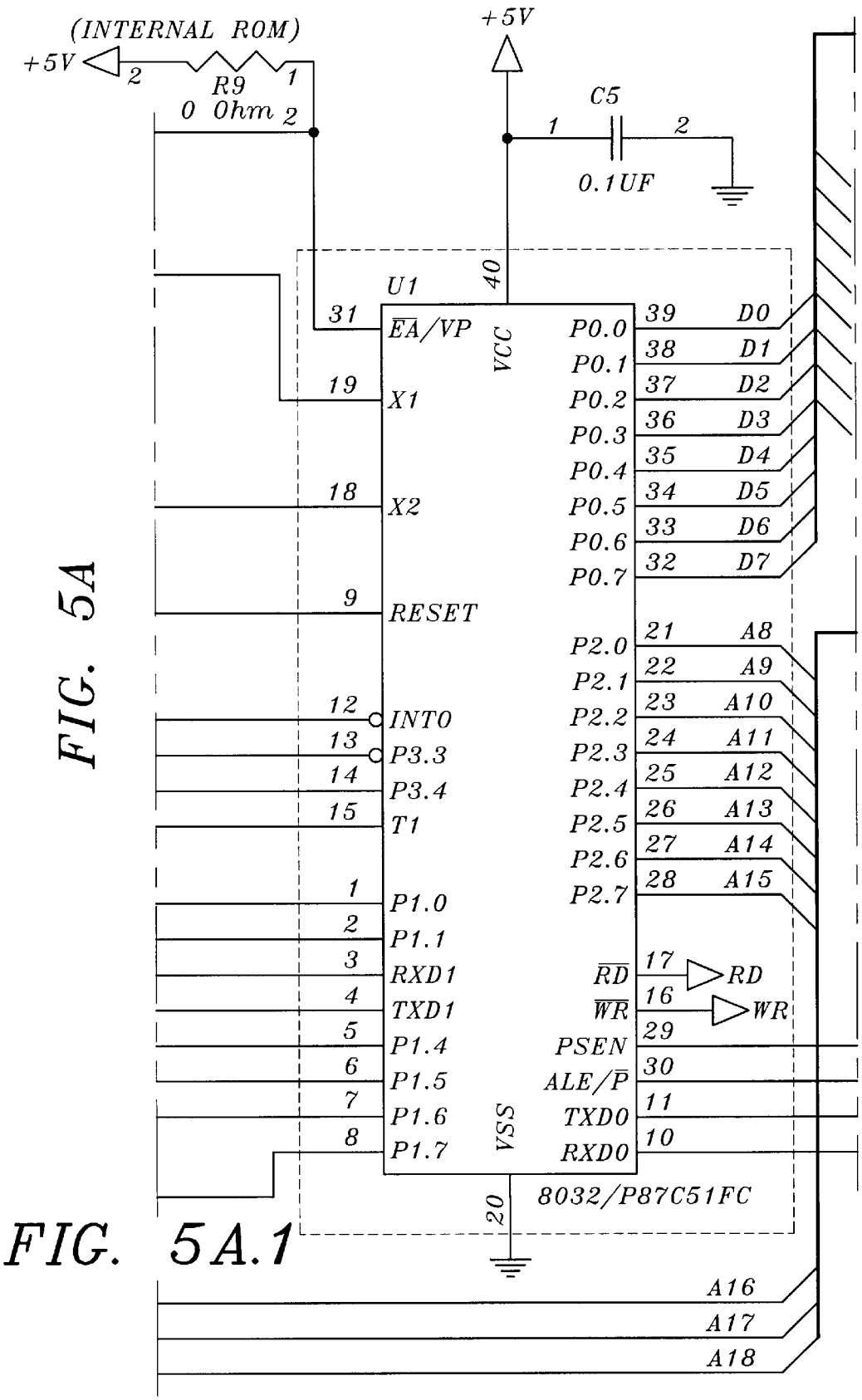

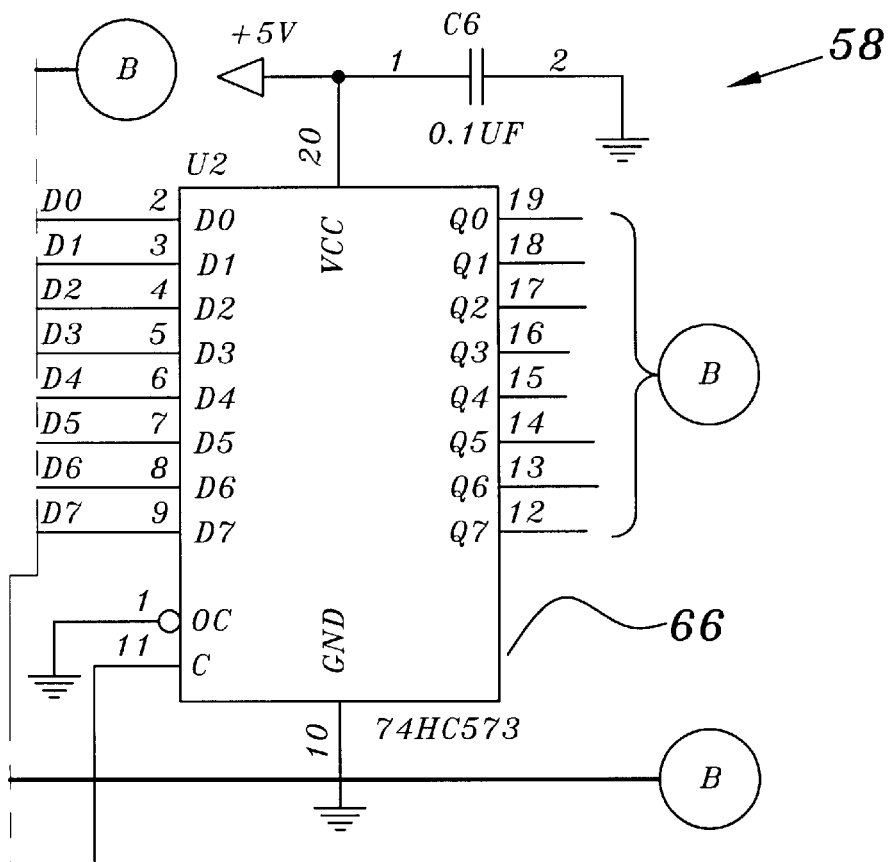
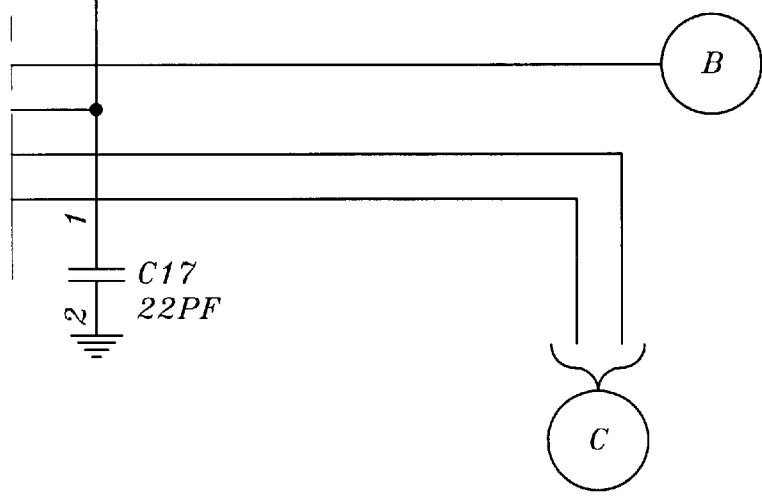
FIG. 5A.1
FIG. 5A.2

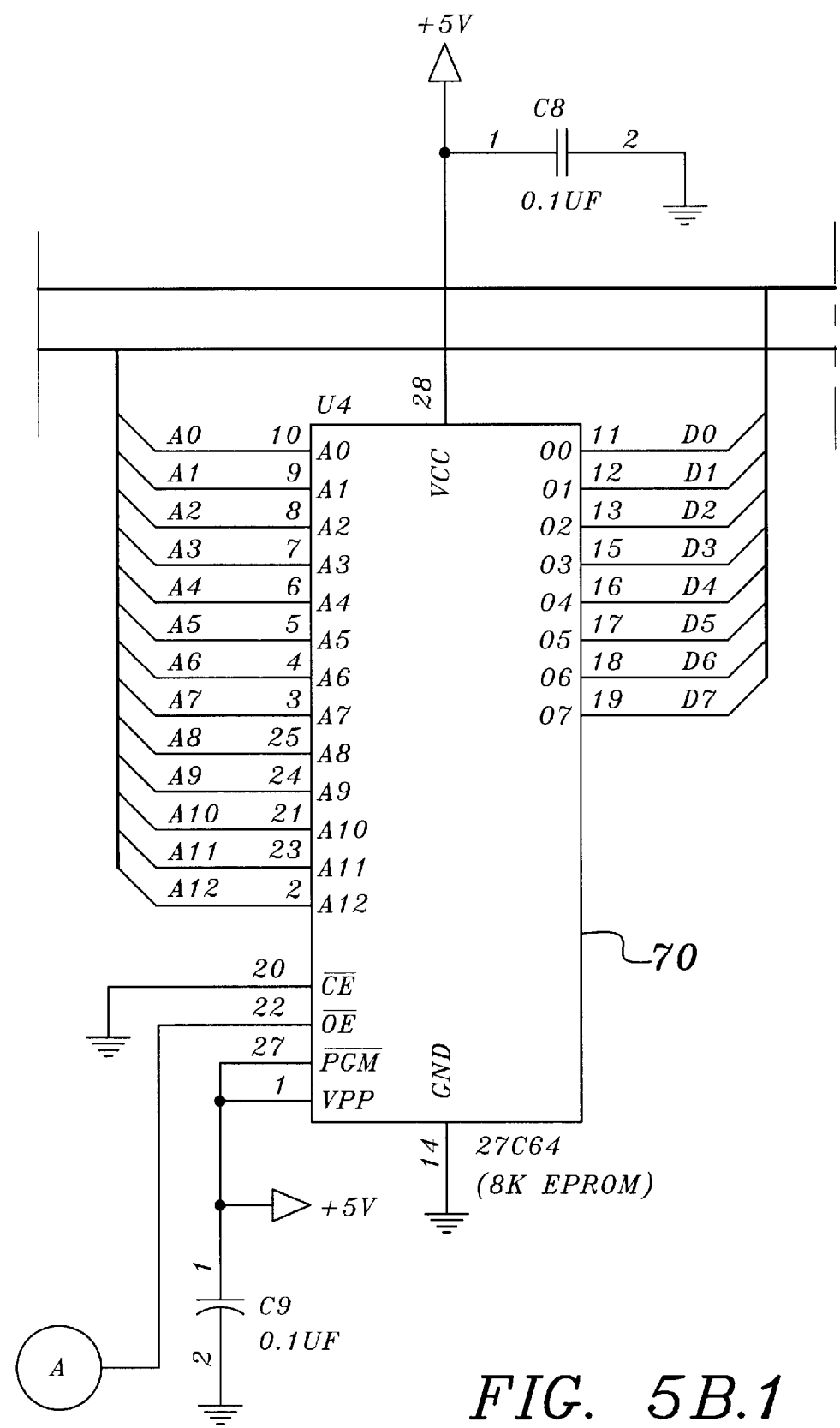

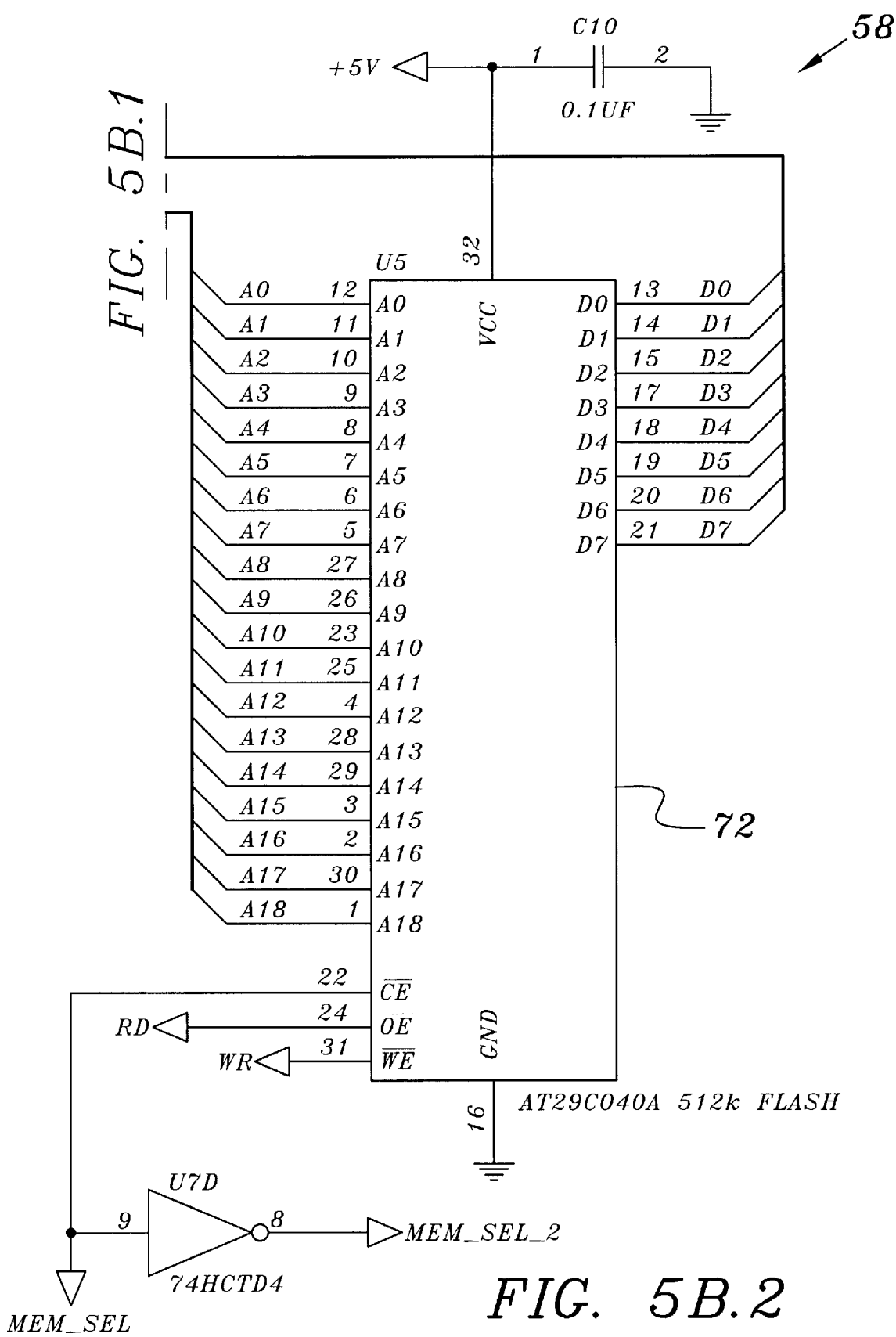

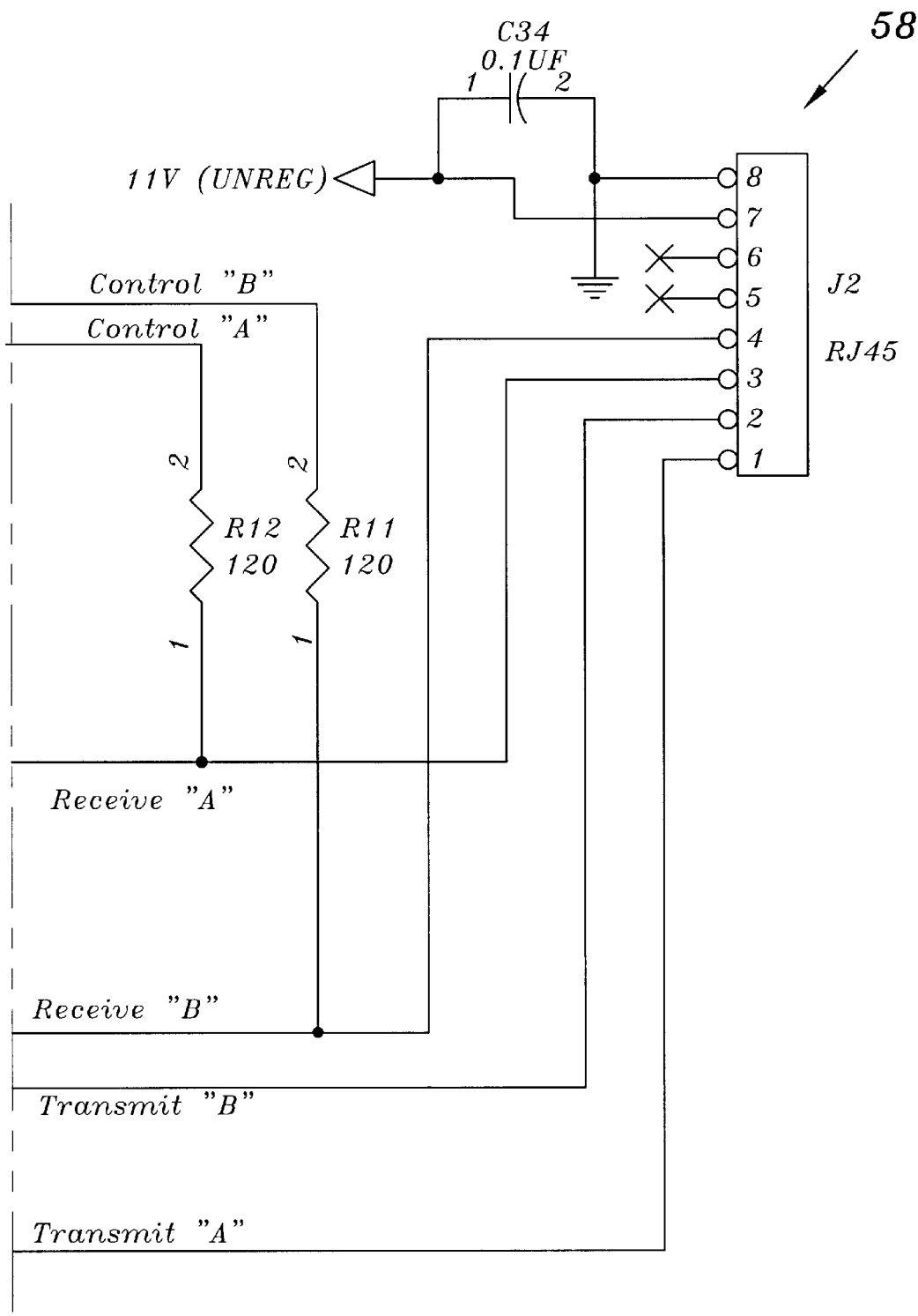
FIG. 5D.1

SYSTEM AND METHOD FOR READING AND TRANSMITTING WATER METER DATA UTILIZING RF SIGNALS

BACKGROUND OF THE INVENTION

1. Field of the Invention

This invention relates to a system for remote reading of utility meters. More particularly, it relates to an automatic electronic system for remote reading of water utility meters in a multi-unit facility employing RF signals to transmit the data read to a central location.

2. Description of Prior Art

The use of RF signals to transmit data from a remote to a central location is well known in the prior art. Further, the use of RF signals to transmit utility meter data (i.e., electricity, gas and water meters) is also well known. For instance, U.S. Pat. No. 3,688,271 to Rouse discloses a method and apparatus for transmitting utility meter data from a single consumer meter to a mobile command unit utilizing RF signals. The Rouse system includes the mobile command unit which must initiate the consumer meter through the transmission of a unique I.D.—a so called "wake-up" procedure. Although the Rouse system was an improvement over the existing prior art in that a utility company employee is not required to personally inspect each consumer meter and to physically note the meter readings, the invention lacks automatic reading features and is not considered a "pure" remote reading system.

Improvement in the art can been seen in U.S. Pat. No. 4,940,976 to Gastouniotis et al. and U.S. Pat. No. 5,448,230 to Schanker et al. Each system attempts to provide an enhanced automatic system for reading data from utility meters and sending it to a central location. But, neither these references nor any other references in the prior art disclose or teach the novel aspects of the present invention. In particular, nothing in the prior art alone or in combination teaches or discloses a fully automatic remote utility meter data reading system of a fixed network capable of reading a plurality of meters automatically and transmitting that data to single collector unit by means of a single RF carrier.

SUMMARY OF THE INVENTION

In multi-unit residential facilities, such as apartment buildings, there is a need for individual unit metering of the utilities provided to the apartment dwellings. This permits the management or owner of the multi-unit complex to charge each individual apartment dweller the exact amount for their consumption of the respective utility. Without such capability, the management or owner must estimate the utility usage for the entire apartment complex for a whole year and attempt to spread the estimated cost among all the apartment dwellers by charging a percentage per month in the rent cost upon signing the lease with the apartment dweller. More particularly, due to the increasing costs and shortages of water throughout the country and the world, a system for permitting exact allocation of water usage is greatly needed.

The present invention addresses and solves the problems seen in multi-unit facility utility consumption by providing a fully automatic remote meter data reading system capable of reading individual meters of each unit and transmitting the read data to a single collection device by means of a single RF carrier.

The present invention contains a plurality of transmitters having microprocessor controlled circuits. The number of transmitters is directly proportional to the number of utility meters which is in turn directly proportional to the number of apartments within the multi-unit facility. The transmitter is capable of entering a low power consumption mode when not reading the meter. Upon powering up, the transmitter reads the meter and transmits its read via a single RF carrier. A single microprocessor controlled repeater, mounted within the apartment complex, receives the multiple transmitter send a single or plurality of transceivers coupled thereto. The repeater holds the data for a short time period and then re-transmits, or repeats, the data through one of the coupled transceivers to a microprocessor controlled collector device. The collector device also has a single transceiver coupled thereto for receiving data along the RF carrier signal. Various interfaces in the collector allow it to receive data or instructions from the transceiver, a remote computer via a modem, or a direct link to a local PC.

BRIEF DESCRIPTION OF THE DRAWINGS

The invention may be best understood by those having ordinary skill in the art by reference to the following detailed description when considered in conjunction with the accompanying drawings in which:

FIG. 2.1 is a partial schematic diagram of an electrical circuit of a meter read transmitter device as shown in connection with FIG. 2;

FIG. 2.2 is a partial schematic diagram of an electrical circuit of a meter read transmitter device as shown in connection with FIGS. 2–2.1;

FIG. 3.1 is a partial schematic diagram of an electrical circuit of a transceiver device for separately coupling to a repeater device and a controller device as shown in connection with FIG. 3;

FIG. 3.2 is a partial schematic diagram of an electrical circuit of a transceiver device for separately coupling to a repeater device and a controller device as shown in connection with FIGS. 3–3.1;

FIG. 4A.1 is a partial first portion of a schematic diagram of an electrical circuit of the repeater device as shown in connection with FIG. 4A;

FIG. 4A.2 is a partial first portion of a schematic diagram of an electrical circuit of the repeater device as shown in connection with FIGS. 4A–4A.1;

FIG. 4B.1 is a partial second portion of the schematic diagram of the electrical circuit of the repeater device as shown in connection with FIG. 4B;

FIG. 4C.1 is a partial third portion of the schematic diagram of the electrical circuit of the repeater device as shown in connection with FIG. 4C;

FIG. 5A.1 is a partial first portion of a schematic diagram of an electrical circuit of the collector device as shown in connection with FIG. 5A;

FIG. 5A.2 is a partial first portion of a schematic diagram of an electrical circuit of the collector device as shown in connection with FIGS. 5A–5A.1;

FIG. 5B.1 is a partial second portion of the schematic diagram of the electrical circuit of the collector device as shown in connection with 5B;

FIG. 5B.2 is a partial second portion of the schematic diagram of the electrical circuit of the collector device as shown in connection with FIGS. 5B–5B.1;

FIG. 5C.1 is a partial third portion of the schematic diagram of the electrical circuit of the collector device as shown in connection with FIG. 5C;

FIG. 5D.1 is a partial fourth portion of the schematic diagram of the electrical circuit of the collector device as shown in connection with FIG. 5D;

DETAILED DESCRIPTION OF THE INVENTION

Figure 1:
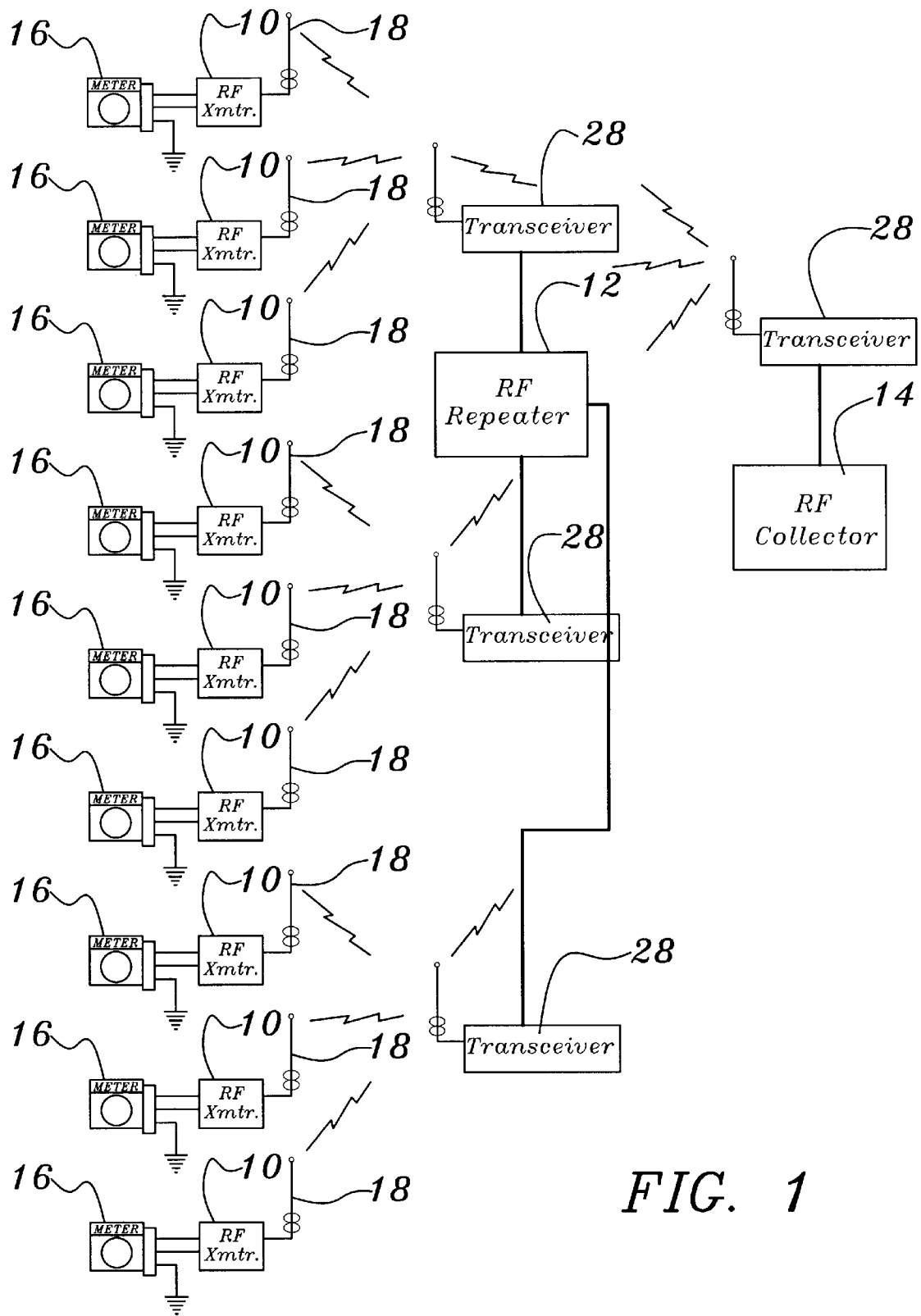
FIG. 1 is a graphical representation of an environment in which the present invention is employed.

Throughout the following detailed description, the same reference numerals refer to the same elements in all figures.

Referring to FIG. 1, a graphic representation of the present invention is shown wherein a plurality of transmitters 10, a single repeater 12 and a single collector 14 are provided. The number of transmitters 10 is directly proportional to the number of water meters 16 used in a multi-unit complex which in turn is directly proportional to the number of apartment units within the complex. For instance, if there are fifty apartment units, there would be fifty separate water meters 16 and hence fifty separate transmitters 10.

Figure 2:
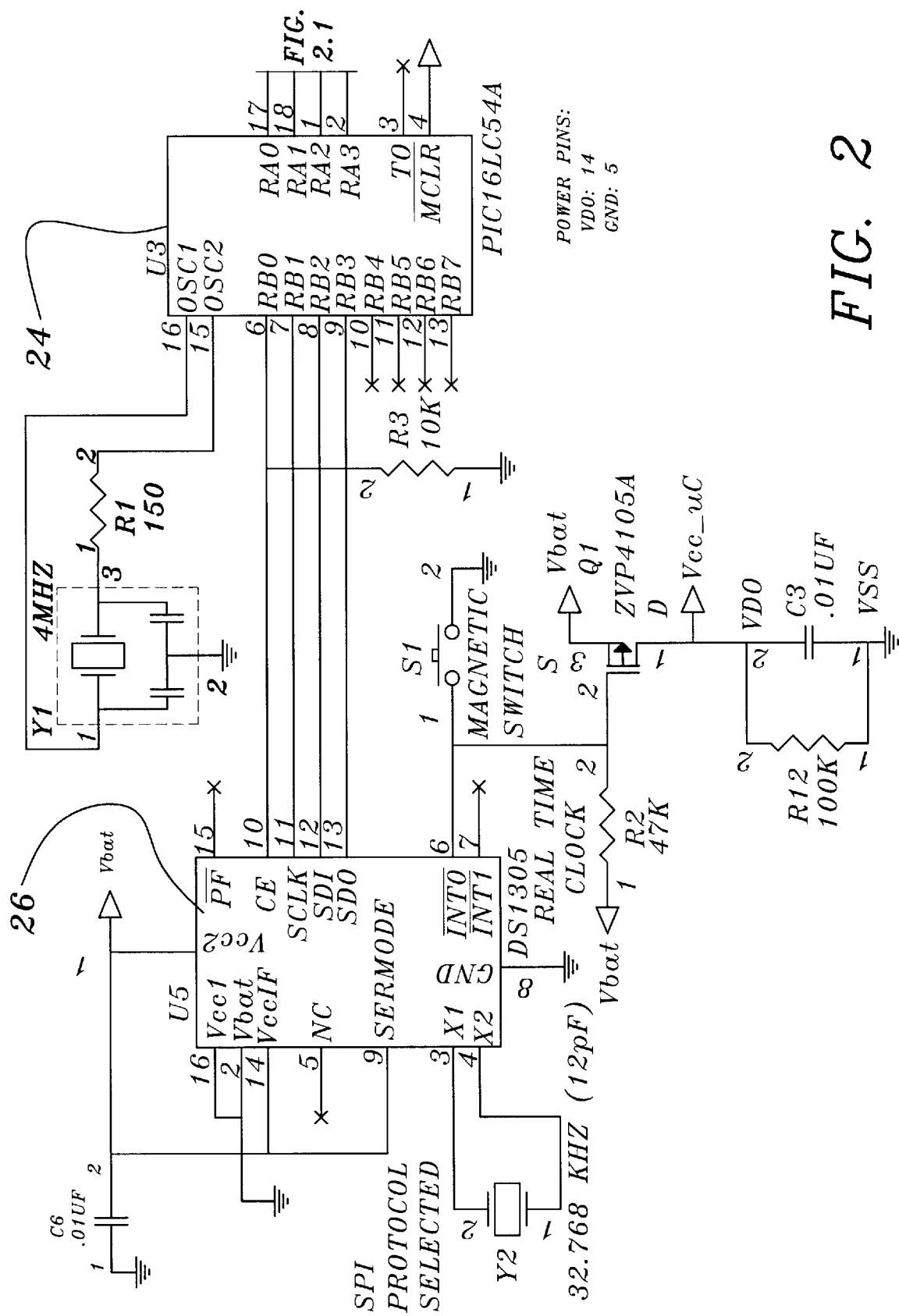
FIG. 2 is a partial schematic diagram of an electrical circuit of a meter read transmitter device employed in the system of the present invention.

Each transmitter 10 has a 50 ohm matched antennae 18 coupled to an electrical circuit 20 of transmitter 10. As shown in FIGS. 2–2.2, antennae 18 is coupled to an RF output, at pin 5, of an LC series transmitter module 22. In the preferred embodiment, a Linx Technology TXM-418-LC transmitter module is used. This type of module transmits serial data at 418 MHZ, the frequency used in the system of the present invention to transmit water meter read data from transmitter 10 to repeater 12 and then again to collector 14. Transmitter module 22 transmits its serial data using CPCA (Carrier-Present, Carrier-Absent) modulation—also referred to as OOK (On-Off Keyed). This type of AM modulation represents a logic low '0' by the absence of a carrier, zero output power, and a logic high '1' by the presence of a carrier.

Further to FIGS. 2–2.2, transmitter module 22 is an eight pin, hybrid SMD module. Pins 1, 3, 4, 6 and 8 are all tied to ground. Pin 2, data in, is coupled to pin 17 of a microcontroller 24 of transmitter circuit 20 and pin 7, positive supply Vcc, is coupled to a power supply through a supply filter. In circuit 20, the supply filter includes a 10 ohm resistor R5 in series with the power supply followed by a 10 uF capacitor from Vcc to ground. The supply filter ensures a clean, well-regulated power source to module 22 in cases where the quality of the power supply source becomes degraded.

With continuing reference to FIGS. 2–2.2, circuit 20 employs microcontroller (PIC) 24, additionally designated as U3 in circuit 20. In the preferred embodiment, a Microchip Technology PIC16LC54A, 8-bit, fully static, EPROM/ROM-based CMOS, eighteen pin, twelve I/O port, microcontroller is employed. The eighteen pins are coupled to other components of circuit 20 in the following manner: pin 1 (RA2) to a first end of an optoisolator circuit (to be discussed in further detail hereinafter), pin 2 (RA3) to a optional LED circuit, pin 3 (T0CKI) floats, pin 4 (MCLR) to the power supply (Vcc), pin 5 to ground (not shown), pin 6 (RB0) to chip enable of a real time clock 26 (to be discussed in further detail hereinafter), pin 7 (RB1) to serial clock of real time clock 26, pin 8 (RB2) to serial data in of real time clock 26, pin 9 (RB3) to serial data out of real time clock 26, pins 10–13 (RB4–7 respectively) float, pin 14 (not shown) to the power supply (Vcc), pins 15 and 16 (OSC1 and OSC2 respectively) to a 4 MHZ crystal, pin 17 (RA0) to data in of transmitter module 22 and pin 18 (RA1) to a second end of the optoisolator circuit.

With continuing reference to FIGS. 2–2.2, the optional LED circuit, coupled to pin 2 of PIC 24, permits an installer of the system to verify that the installation of the transmitter is proper. The optoisolator circuit is coupled between PIC 24 and water meter 16. In the preferred embodiment, an encoder type water meter is used, although the system of the present invention could be modified to interface with a pulsar type meter. Each encoder meter has three leads—R, G and B. In the preferred embodiment, R is the clock line, G is the data line and B is ground. The optoisolator circuit includes a single transistor type multi optocoupler and a plurality of resistors. In the preferred embodiment, an NEC PS2501-2 is employed for the multi-optocoupler. As shown in FIG. 2, pin 1 of the multi-optocoupler is coupled through a resistor to the power supply (Vcc). Pin 2 is coupled to pin 18 of PIC 24. Pin 3 is coupled through a resistor to Vcc 5 v. Pin 4 is coupled to 'G' on water meter 16. Pin 5 is coupled to ground. Pin 6 is coupled to a line connecting pin 1 of PIC 24 to the power supply (Vcc). Pin 7 is coupled to 'R' on water meter 16. Pin 8 is coupled to Vcc 5 v. Vcc 5 v, provided by a voltage doubler of circuit 20, is used to activate meter 16 and permit a read thereupon by circuit 20. The optoisolator circuit provides electrical isolation between the water meter and the transmitter circuitry.

With continuing reference to FIGS. 2–2.2, it is shown that a voltage doubler circuit is employed within transmitter electrical circuit 20. The voltage doubler circuit employs a monolithic CMOS voltage conversion IC, designated by the symbol U1, a pair of capacitors, C1 and C2, and a pair of diodes, D1 and D2. In the preferred embodiment, a Harris Semiconductor ICL7660S super voltage converter (eight pin plastic DIP) is used for the voltage conversion IC. C1 and C2 are 10 uF capacitors and D1 and D2 are Liteon 1N4002CT diodes. The voltage divider circuit provides positive voltage doubling to electrical circuit 20. In particular, the pump inverter switches of U1 are used to charge C1 to a voltage level of Vcc minus Vdiode, where Vcc is the supply voltage and Vdiode is the forward voltage on C1 plus the supply voltage. This voltage level is applied through D2 to capacitor C2. The voltage thus created on C2 becomes 2(Vcc) −2(Vdiode) or twice the supply voltage minus the combined forward voltage drops of D1 and D2. In the preferred embodiment, a 3.6 voltage battery is used as the supply voltage or Vcc. Since there is a 0.6 v drop across each diode, the resulting doubled voltage becomes approximately 5 v, or 2(3.6) −2(0.6) =6.0 v. It is noted that pin 6 or LV is left floating to prevent device latchup.

With further reference to FIGS. 2–2.2, it shown that a real time clock (RTC) 26 is employed in transmitter electrical circuit 20. In the preferred embodiment, a Dallas Semiconductor DS1305, serial alarm real time clock is used, additionally designated in circuit 20 as U5. RTC 26 is configured to a "battery operate mode" wherein RTC 26 is powered by a 3.6 v single cell battery. Accordingly, Vcc1 and Vbat (pins 16 and 2 respectively) of RTC 26 are tied to ground while Vcc2 (pin 1) is coupled to the 3.6 v battery source. RTC 26 is capable of operating in two distinct serial interface modes. In the preferred embodiment, RTC 26 utilizes the Motorola Serial Peripheral Interface (SPI), wherein VccIF (pin 14) is tied to the SERMODE pin (pin 9). Four pins are used for the SPI: CE, SCLK, SDI and SDO. SDI and SDO (pins 12 and 13 respectively) are the serial data input and output pins for RTC 26, respectively. CE is used to initiate and terminate a data transfer between RTC 26 and PIC 24. SCLK is used to synchronize data movement between the master (PIC 24) and the slave (RTC 26). X1 and X2 (pins 3 and 4, respectively) are coupled to a 32.768 KHz quartz crystal. INT0 (pin 6), an active low, is used as an interrupt input to PIC 24. As shown in FIG. 2, INT0 is coupled to an auxiliary initiation circuit which includes, inter alia, a magnetic switch S1 and a ZVP4105A P-Channel MOSFET Q1. Since INT0 is an open drain output, it requires an external pull-up resistor, which is shown as R2, a 47K ohm resistor tied to Vbat. A 100K ohm resistor R12 and a 0.01 uF capacitor C9 coupled in parallel to ground provides a buffer for the auxiliary initiation circuit.

With continuing reference to FIGS. 2–2.2, a shield bead L1 is shown and is tied between analog and digital grounds of circuit 20. Shield bead Li acts as a high frequency noise filter for keeping digital noise off the RF ground.

Once meter 16 is read, the data is transmitted from transmitter 12 on the 418 MHZ RF carrier to repeater 12. A plurality of transceivers 28 are coupled to repeater 12 for receiving the RF carrier frequency and for transmitting that same water meter data to collector 14 after an elapsed time period. In the preferred embodiment, up to five transceivers 28 are coupled to repeater 12. It is understood that in small systems, repeater 12 can be removed whereby transmitters 10 transmit their data directly to collector 14.

Figure 3:
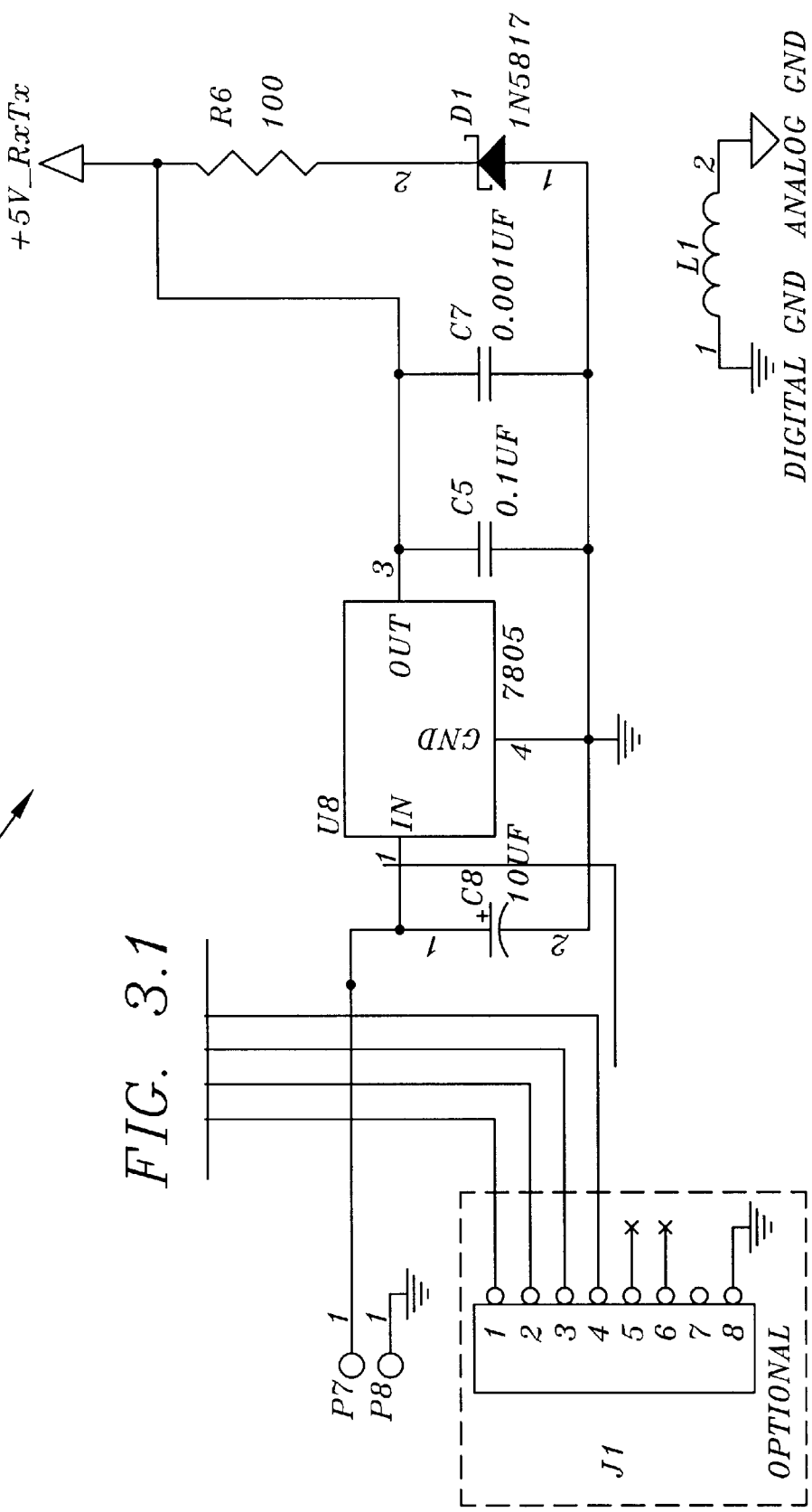
FIG. 3 is a partial schematic diagram of an electrical circuit of a transceiver device for separately coupling to a repeater device and a collector device both employed in the system of the present invention.

Referring to FIGS. 3–3.2, an electrical circuit 30 is shown representing the electrical circuitry of transceiver 28. Power is supplied to transceiver 28 from an interface with repeater 12. In the preferred embodiment, a six conductor, category 5 cable is used for the interface between transceiver 28 and repeater 12. Connections P1–4 and P7–8 represent the six conductor connection points for circuit 30 to repeater 12. In an alternate embodiment, an RS422 interface is employed wherein connection with repeater 12 is made at J1 of circuit 30. In each embodiment, an unregulated 11 v is supplied to transceiver 28 at P7, or J1 pin 7, from a power supply of repeater 12 (not shown). A voltage regulation circuit, including, inter alia, a three terminal positive voltage regulator, is coupled to the unregulated 11 v supply voltage for converting the unregulated supply to a regulated 5 v. In the preferred embodiment, a Motorola MC78M05CDT regulator is employed. The regulated 5 v is supplied to four ICs of circuit 30.

With continuing reference to FIGS. 3–3.2, an LC series receiver module 32 is provided in circuit 30. In the preferred embodiment, a Linx RXM-418-LC receiver module is employed. Module 32 is a ten pin IC designed to recover data sent by a CPCA transmitter. Module 32 is configured such that pin 1, RF data in, is coupled to an antenna 34, pins 2, 4, 7, 9 and 10 float, pins 3 and 8 (internally connected) are both tied to ground, pin 5, data out, is coupled to a driver output enable and driver input pin of a transceiver IC (to be discussed in further detail hereinafter), pin 6, positive supply Vcc for voltages in the range of 4.2–5.2 vDC is coupled to ground through a capacitor and to the regulated 5 v through a resistor (the resistor and capacitor arrangement representing a supply filter for Vcc pin 6).

With continuing reference to FIGS. 3–3.2, a transceiver IC 36 is provided. In the preferred embodiment, a Maxim 483CSA, RS485/RS422, eight pin, half duplexing, transceiver IC is employed. Transceiver 36 is configure such that pin 1, RO floats, pin 2, RE is coupled to pin 8, Vcc which in turn are both coupled to the regulated positive 5 v supply, pins 3 and 4, DE and DI respectively, both receive data out from receiver module 32, pin 5 is tied to ground and pins 6 and 7, A and B respectively, representing RXA and RXB respectively are coupled to interface connection points 3 and 4 respectively, which are coupled to repeater 12.

Data received by transceiver 28 is supplied to repeater 12 and held for a duration of time. Upon a routine (to be discussed in further detail hereinafter), the data received by repeater 12 is re-transmitted, or repeated, to collector 14. Accordingly, the meter read data is supplied to transceiver 28 from repeater 12 for transmission to collector 14. As shown in FIGS. 3.1 and 3.2, connection points 1 and 2 of the interface receive the data from repeater 12 and represent TXA and TXB respectively. TXA and TXB are coupled to inverting and non-inverting receiver inputs, pins 7 and 8 respectively, of a transceiver IC 38. In the preferred embodiment, transceiver 38 is a Maxim 488CSA, RS485/ RS422, eight pin, full duplexing, transceiver IC. The remaining six pins are configured such that pin 1, Vcc is coupled to the regulated positive 5V supply, pin 2, RO or receiver output, is coupled to data in of a transmitter module 40, pins 3, 5 and 6 float and pin 4 is tied to ground.

With continuing reference to FIGS. 3–3.2, data outputted from transceiver 38 is supplied to transmitter module 40. In the preferred embodiment, a Linx TXM-418-LC series transmitter is employed. Transmitter module 40 has an antenna 42 coupled to an RF out (pin 5) for transmitting the 418 MHZ RF carrier frequency to collector 14. Pin 7 of module 40 is coupled to the regulated positive 5V supply and all remaining pins are tied to ground.

Figure 4A:
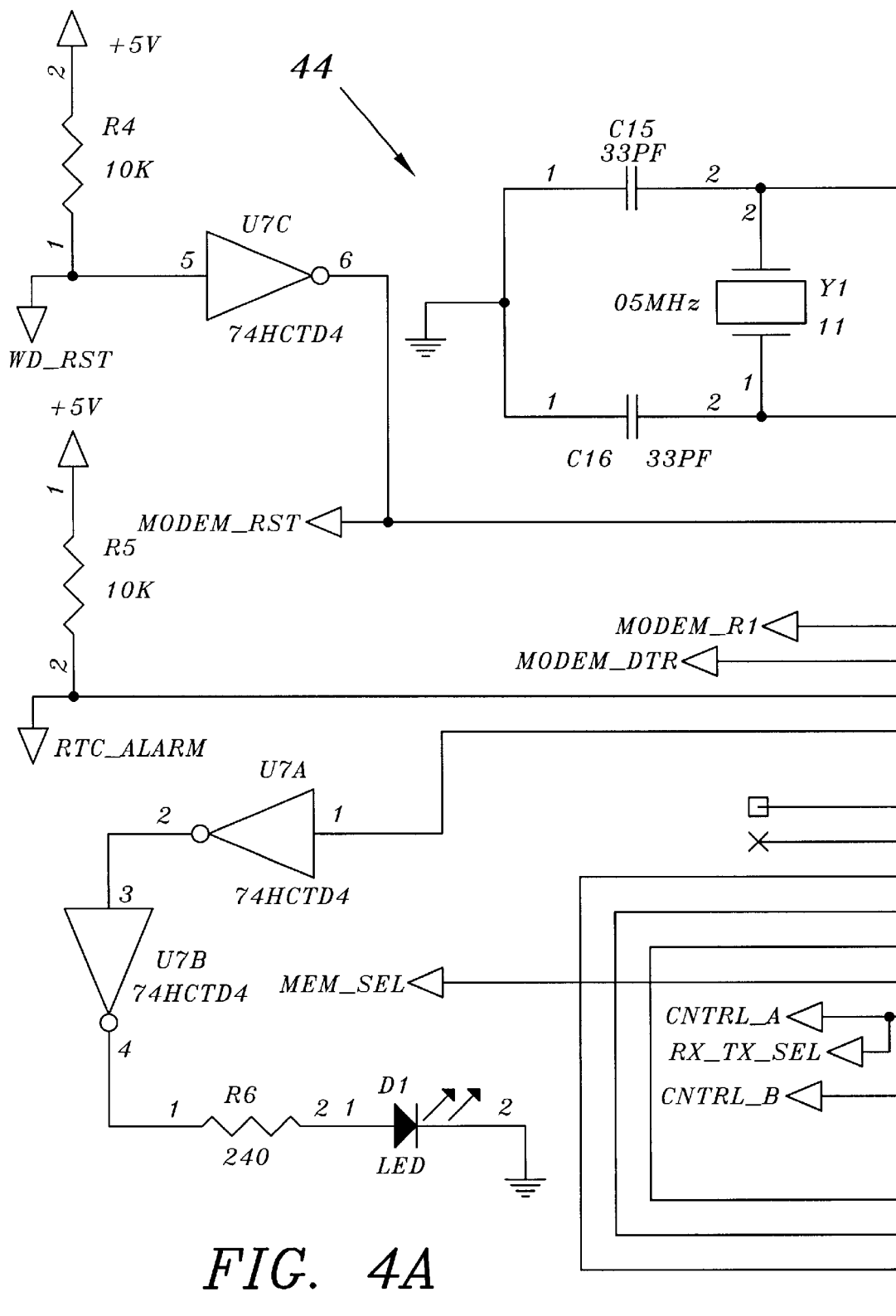
FIG. 4A is a partial first portion of a schematic diagram of an electrical circuit of the repeater device.
Figure 4B:
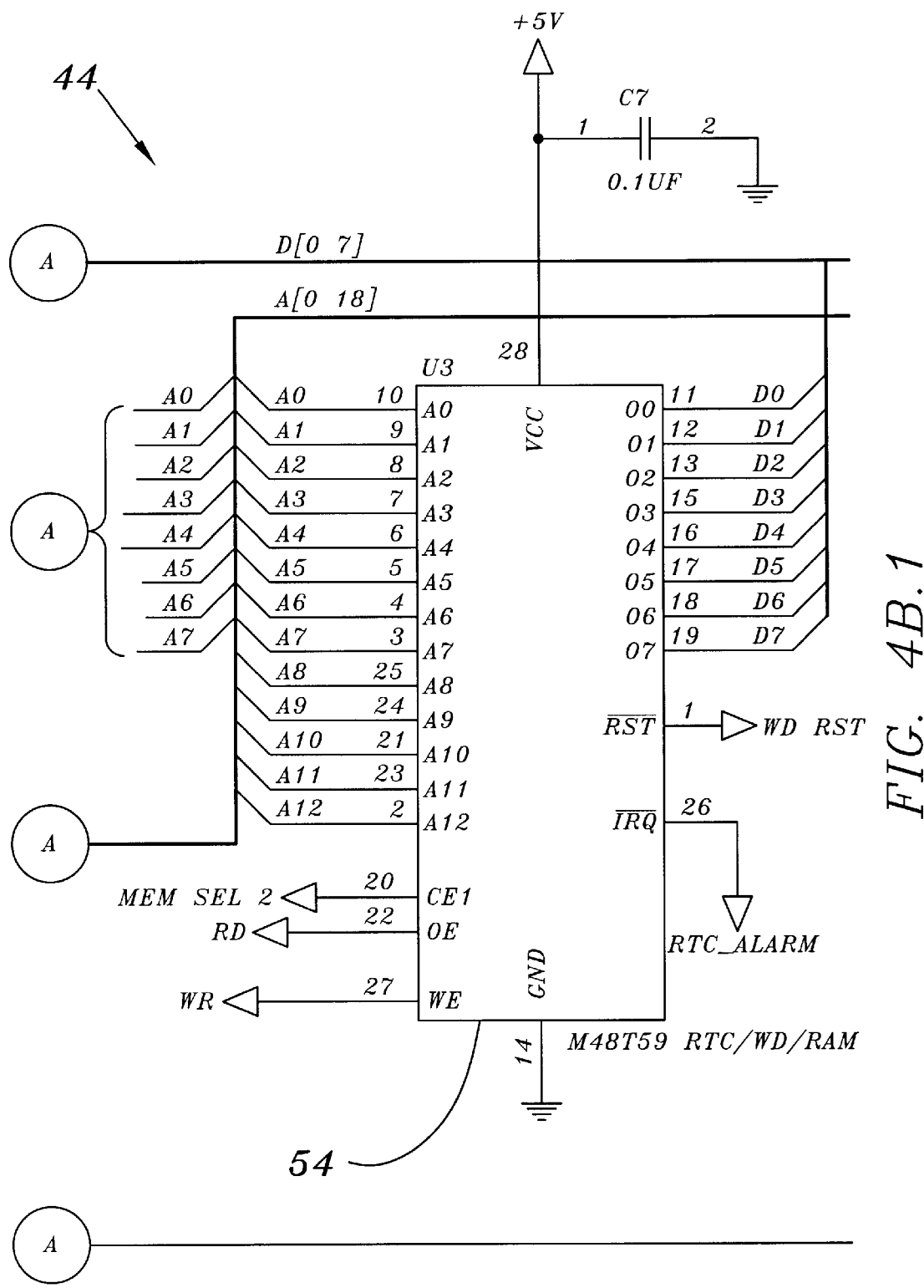
FIG. 4B is a partial second portion of the schematic diagram of the electrical circuit of the repeater device.
Figure 4C:
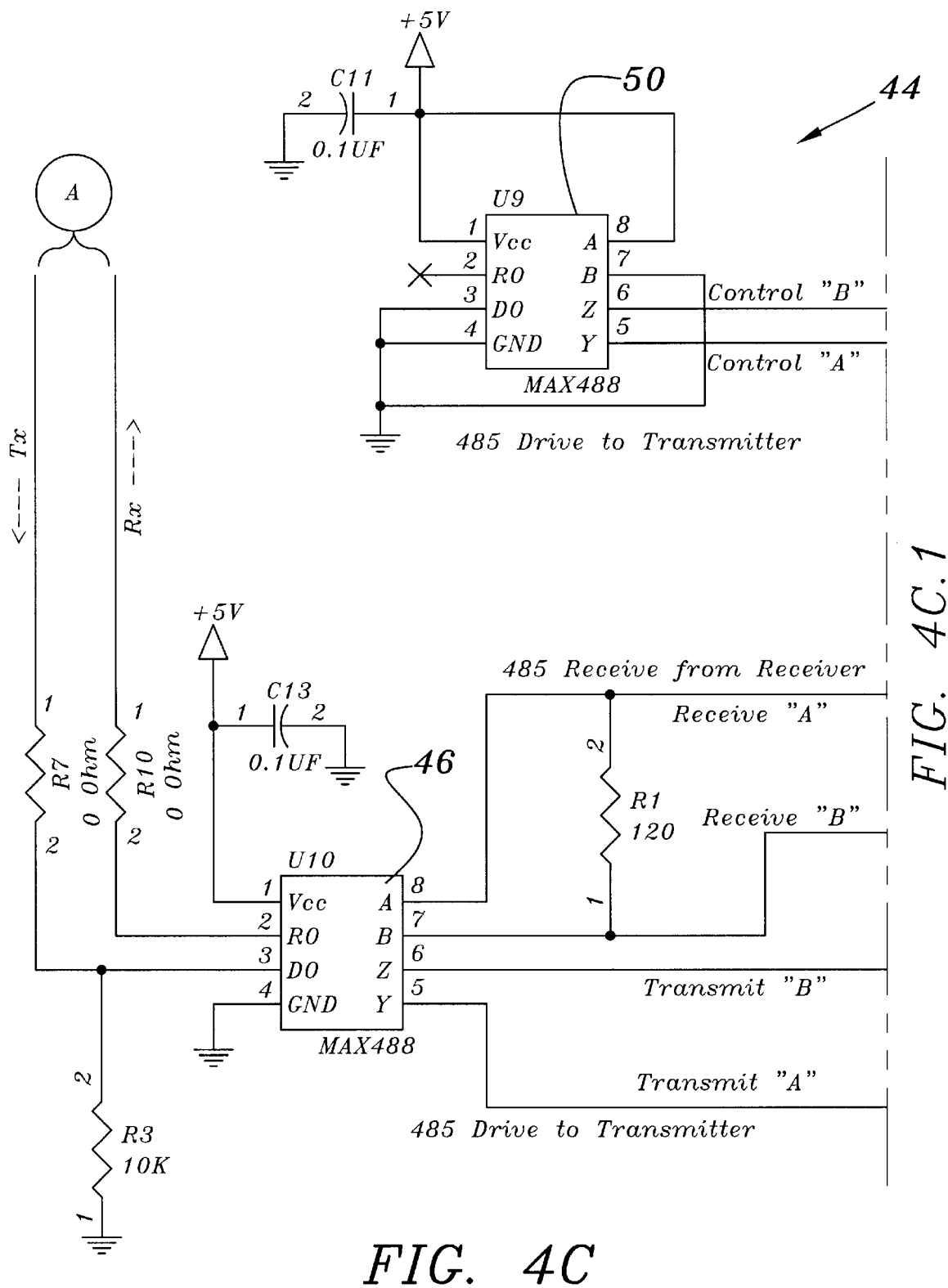
FIG. 4C is a partial third portion of the schematic diagram of the electrical circuit of the repeater device.

With reference now to FIGS. 4A–4C.1, an electrical circuit 44 is shown representing the circuitry of repeater 12.

It is understood that the circuitry is "pieced" together by connecting the various circled points A, B and C. For instance, by following the four points on FIG. 4A.2 represented by the circled letter B leads to the circuitry shown in FIG. 4B wherein circled A connects to circled B.

As shown in FIG. 4C, received meter read data from interface connection points 3 and 4 is inputted to a transceiver module 46 at ports A and B, pins 8 and 7 respectively of module 46. The data received therein is outputted at pin 2, RO or receiver output, to a microcontroller 48 at pin 10, designated as RXDO or the serial data input port. In the preferred embodiment, transceiver 46 is a Maxim 488CSA, RS-485/RS422, eight pin, full duplexing, transceiver IC and microcontroller 48 is a Phillips Semiconductors 80C32 8-bit, 40 pin, microcontroller.

Further to the circuitry of repeater 12, and as shown in FIGS. 4C–4C.1, a second transceiver module 50 is employed in circuit 44. Module 50 is coupled to data receive lines 'A' and 'B' and drives the receive lines low when transceivers 28 are not receiving data from transmitters 10. In the preferred embodiment, a Maxim 488CSA, RS-485/RS422, eight pin, full duplexing, transceiver IC is used for module 50.

Referring to FIGS. 4A–4A.2 and 4B–4B.1, it is shown that additional components are employed in circuit 44. In particular, octal latches 52, timekeeper SRAM 54 and optional EPROM 56 are employed to operate circuit 44.

Referring to FIGS. 5A–5D.1, an electrical circuit 58 is shown representing the circuitry of collector 14. It is understood that the circuitry is "pieced" together by connecting the various circled points A, B and C. For instance, by following the four points on FIG. 5A.2 represented by the circled letter B leads to the circuitry shown in FIG. 5B.2 wherein circled A connects to circled B.

Figure 5A:
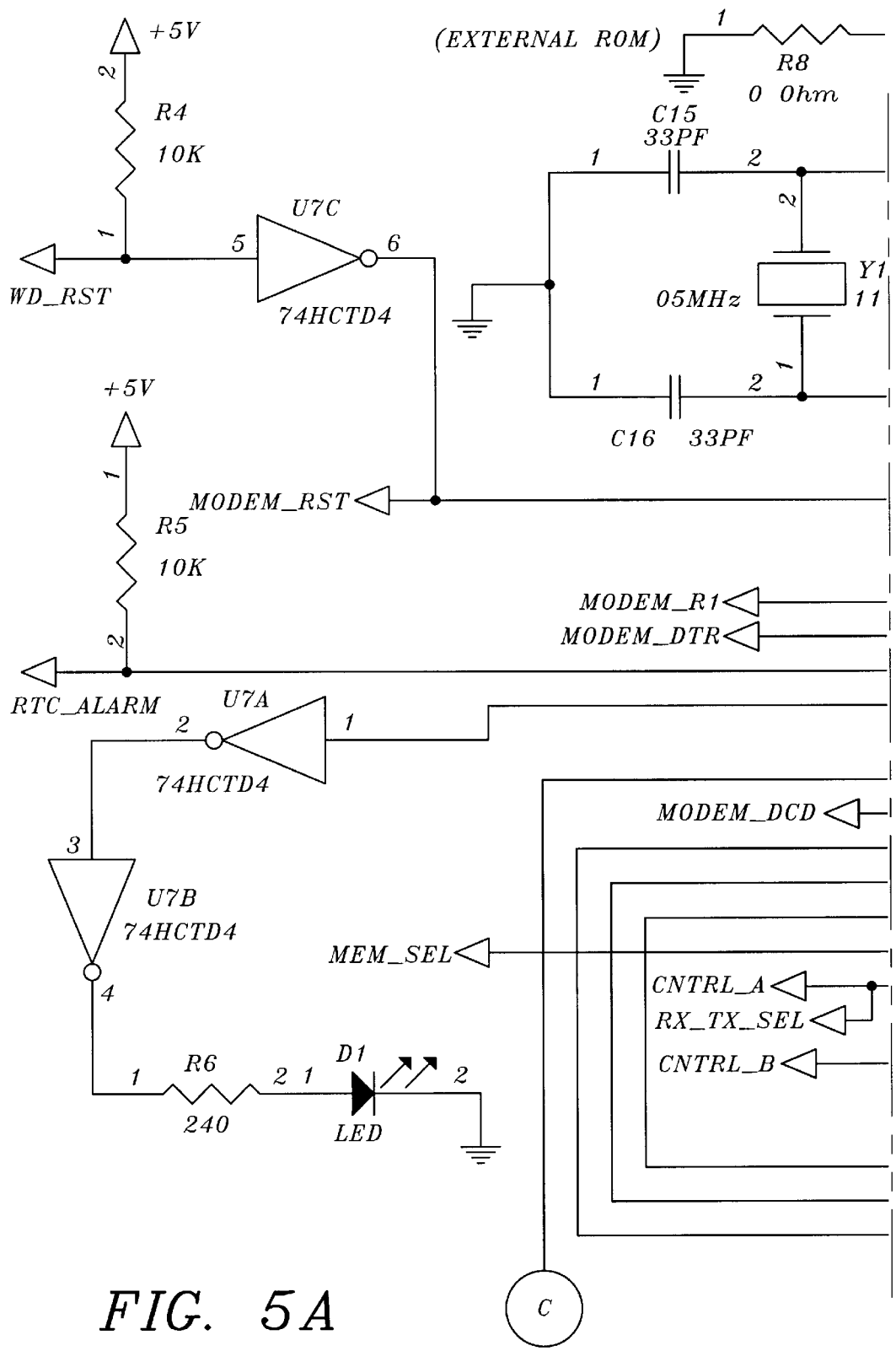
FIG. 5A is a partial first portion of a schematic diagram of an electrical circuit of the collector device.
Figure 5B:
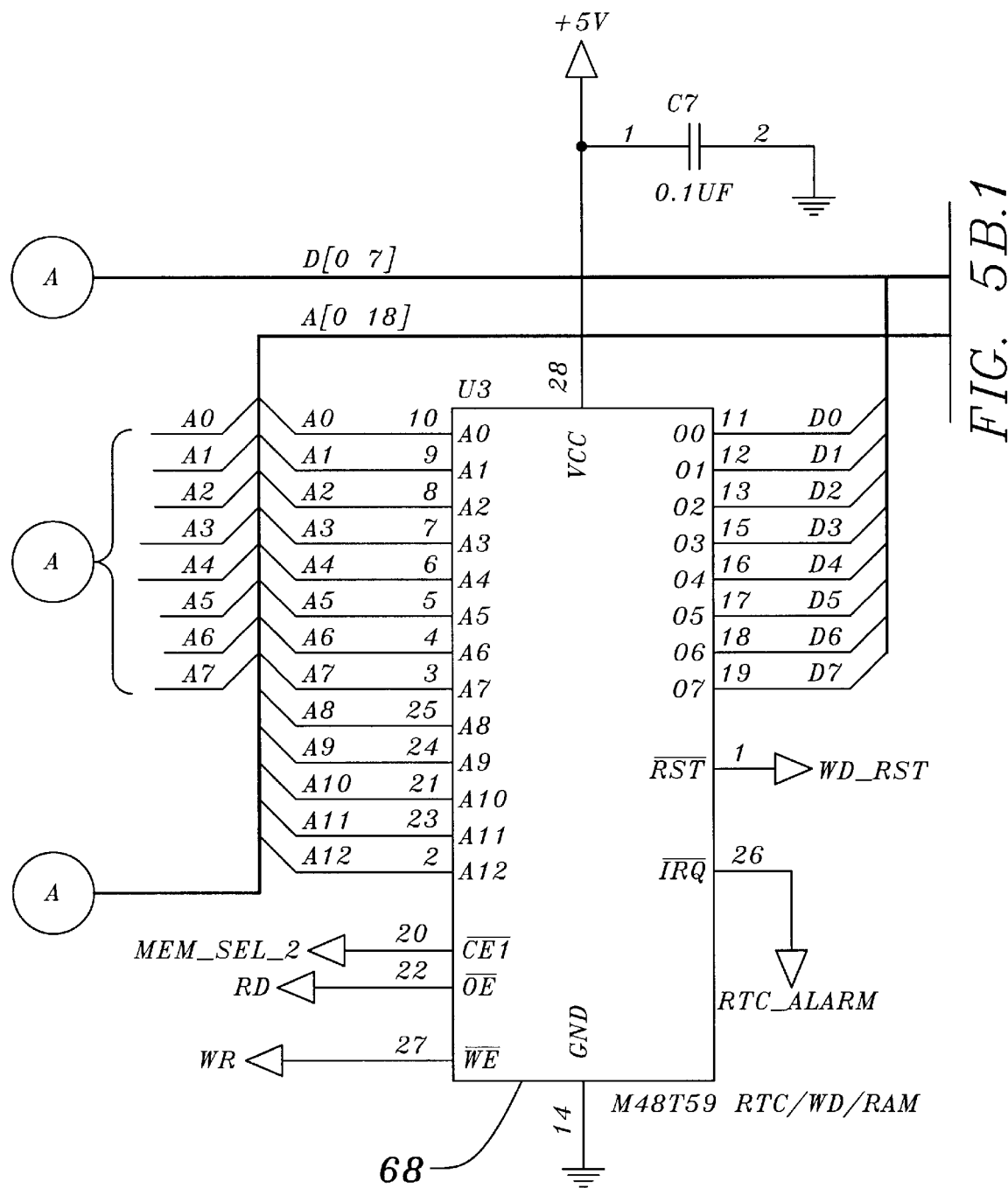
FIG. 5B is a partial second portion of the schematic diagram of the electrical circuit of the collector device.
Figure 5C:
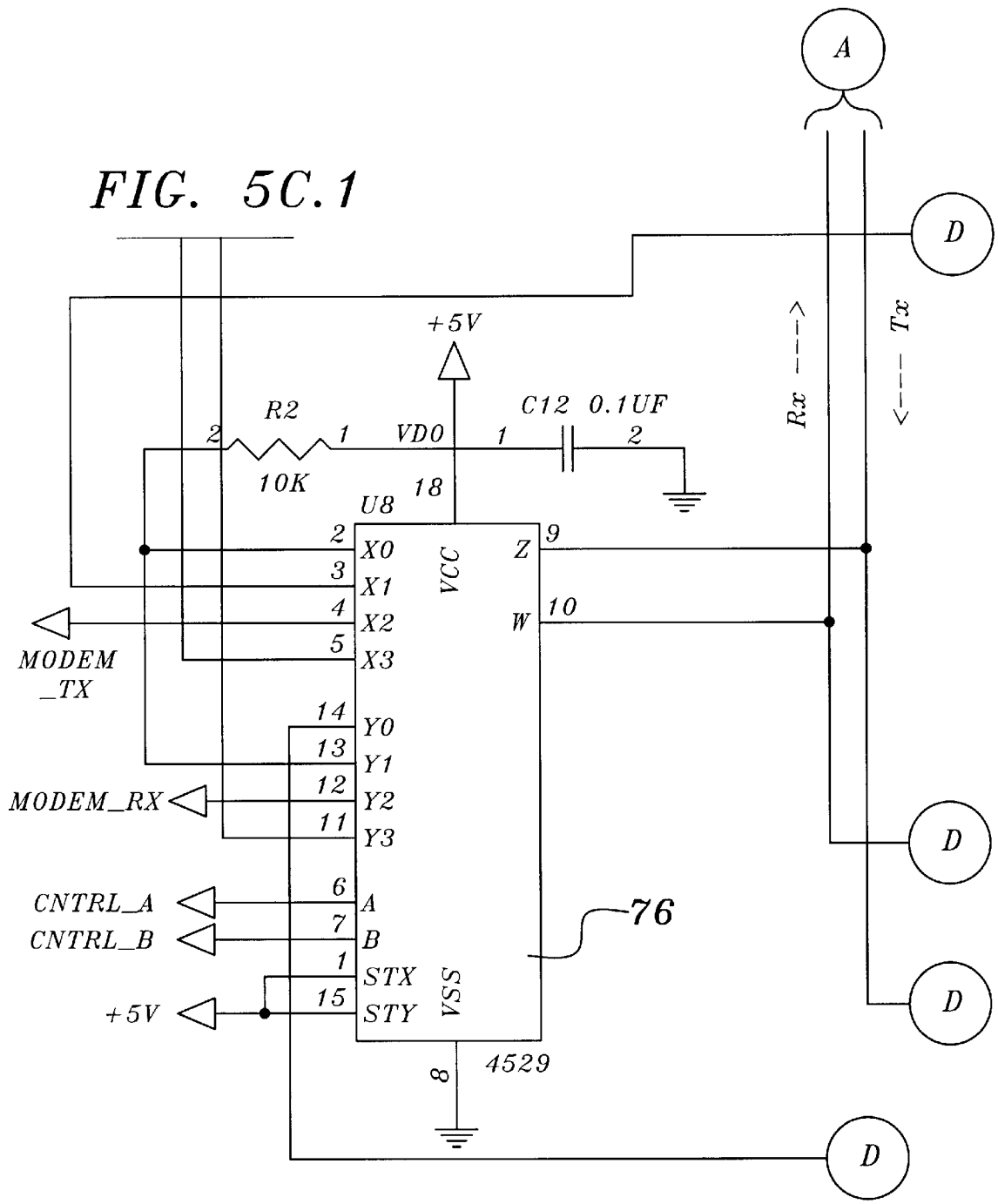
FIG. 5C is a partial third portion of the schematic diagram of the electrical circuit of the collector device.
Figure 5C:
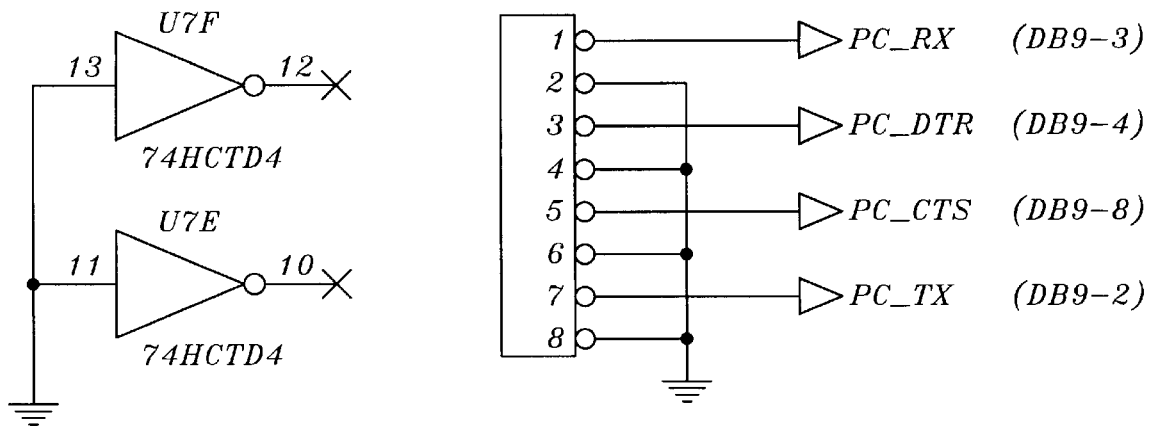
Figure 5C:
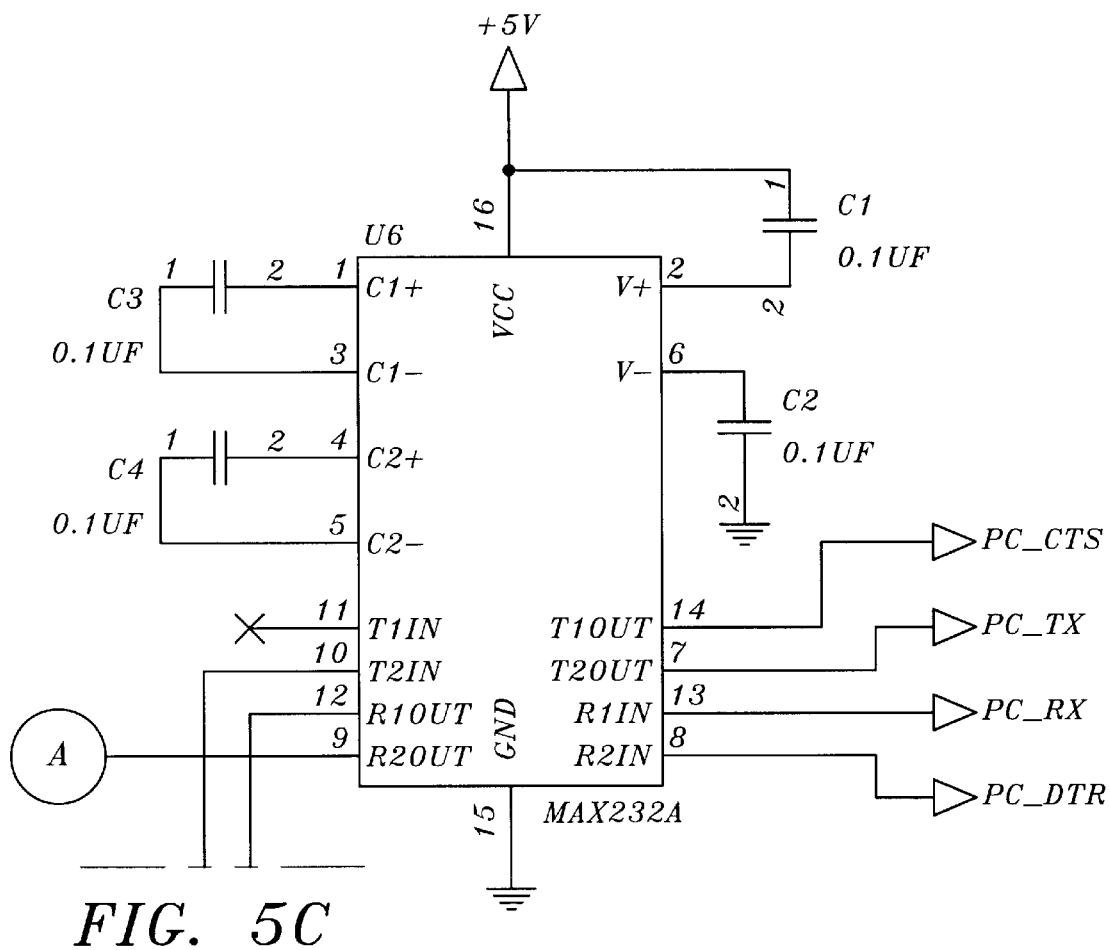
Figure 5D:
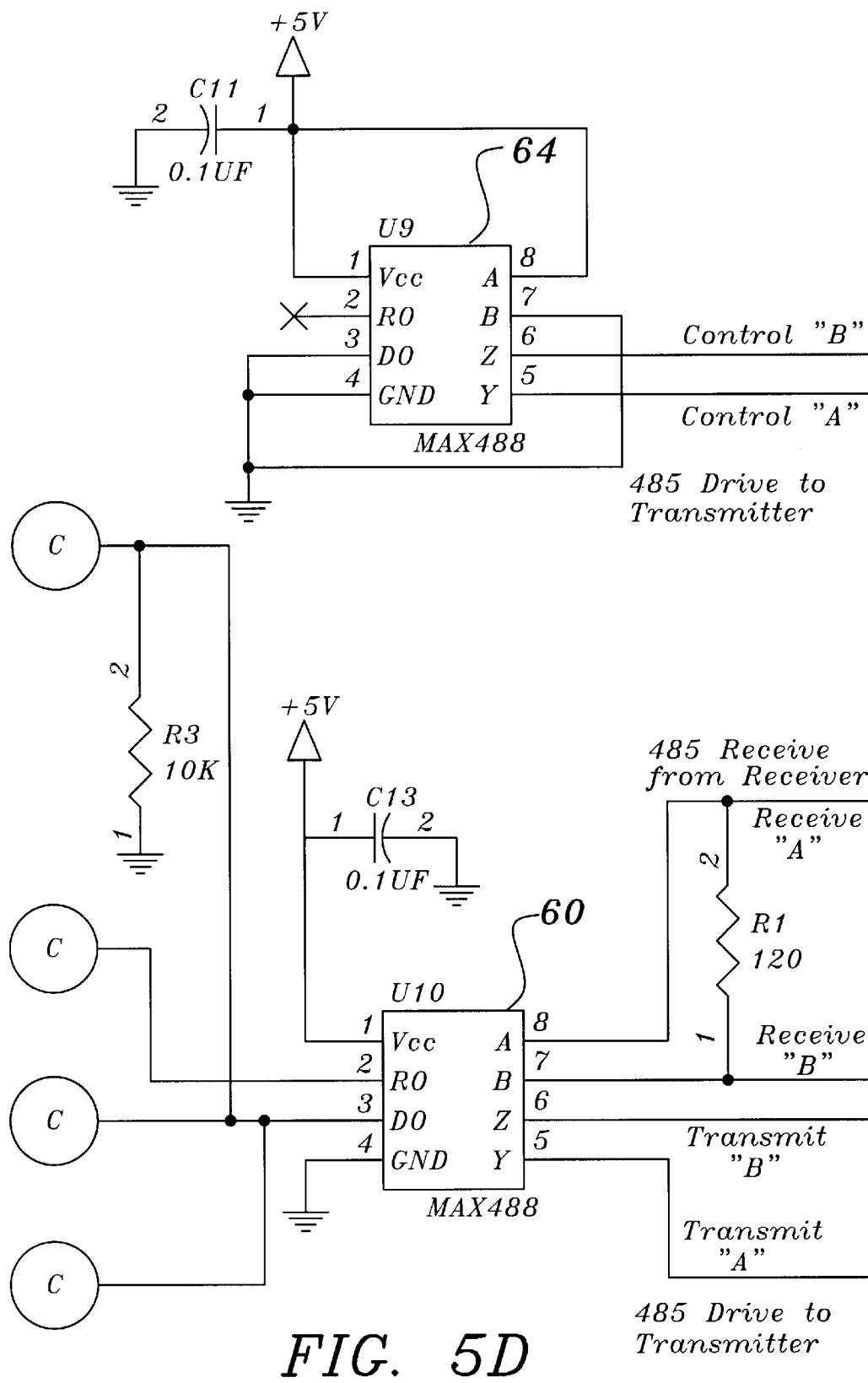
FIG. 5D is a partial fourth portion of the schematic diagram of the electrical circuit of the collector device.

Collector 14 receives RF data from a transceiver 28 which is identical to the transceivers used with repeater 12. The RF data received by the collector transceiver is transmitted from one of the repeater transceivers. In the preferred embodiment, the collector transceiver interfaces with collector 14 via an RS422 interface connection using RJ45, six conductor, category 5 cabling. As shown in FIGS. 5D–5D.1, meter read data received by the collector transceiver is directed to interface J2 at connection points 3 and 4 and is inputted to a transceiver module 60 at ports A and B, pins 8 and 7 respectively of module 60. The data received therein is outputted at pin 2, RO or receiver output, to a microcontroller 62 at pin 10, designated as RXDO or the serial data input port. In the preferred embodiment, transceiver 60 is a Maxim 488CSA, RS-485/RS422, eight pin, full duplexing, transceiver IC and microcontroller 62 is a Phillips Semiconductors 80C32 8-bit, 40 pin, microcontroller.

Further to the circuitry of collector 14, and as shown in FIG. 5D, a second transceiver module 64 is employed in circuit 58. Module 64 is coupled to data receive lines 'A' and 'B' and drives the receive lines low when the collector transceiver is not receiving data. In the preferred embodiment, a Maxim 488CSA, RS485/RS422, eight pin, full duplexing, transceiver IC is used for module 64.

Referring to FIGS. 5A–5D.1, is shown that collector electrical circuit 58 is almost identical to repeater electrical circuit 44 except for additional components employed with collector 14. Accordingly, collector 14 employs octal latches 66, timekeeper SRAM 68 and optional EPROM 70. In addition, collector electrical circuit 58 employs 512K of flash memory 72, a driver/receiver level translator 74 for an RS232 interface, an analog data select 76 and a modem (not shown).

In the preferred embodiment, the system of the present invention operates under rules defined by the FCC in Part 15. A 20 dB relaxation on the power limitations is allowed if a duty cycle, or the on/off ratio, is 10% or less for any 100 millisecond transmission. To meet this requirement, the transmitter and repeater of the present system follow a certain novel protocol. First, the amount of data being transmitted is fixed and therefore the duration of each transmission is fixed—this duration always being less than one second. Secondly, the duty cycle, over any 100 millisecond period, is always less than 10%. This is guaranteed by the novel encoding scheme used by the system. In particular, each transmission consists of a maximum of 226 "on" pulses—226 being a theoretical maximum which is not realized in actual use, but is entertained to derive worst-case conditions. The duration of each pulse is approximately 250 microseconds (this being dependant on the tolerance of the oscillator, which is 5%). There is a 50 millisecond blanking period after each 16 pulses; no pulses are transmitted during the blanking period. Accordingly, the maximum number of pulses during a 100 millisecond period would be two 16-bit pulse trains, or 32 pulses. At 250 microseconds per pulse, this amounts to a total "on" time of 8 milliseconds. Thus, the duty cycle is 8%.

Further to the novel protocol used in transmissions in the present invention, transmitters 10 transmit every 6 to 7 hours. The exact period is randomized, but never less than 6 hours and never more than seven hours. Repeater 12 will not transmit more than once per thirty-one (31) second period, thereby satisfying certain Part 15 requirements that the silent period between transmissions must be thirty (30) times the duration of the transmission. This thirty-one (31) second period is guaranteed by instructions carried out by novel firmware in repeater 12, in conjunction with its internal real time clock.

Figure 6A:
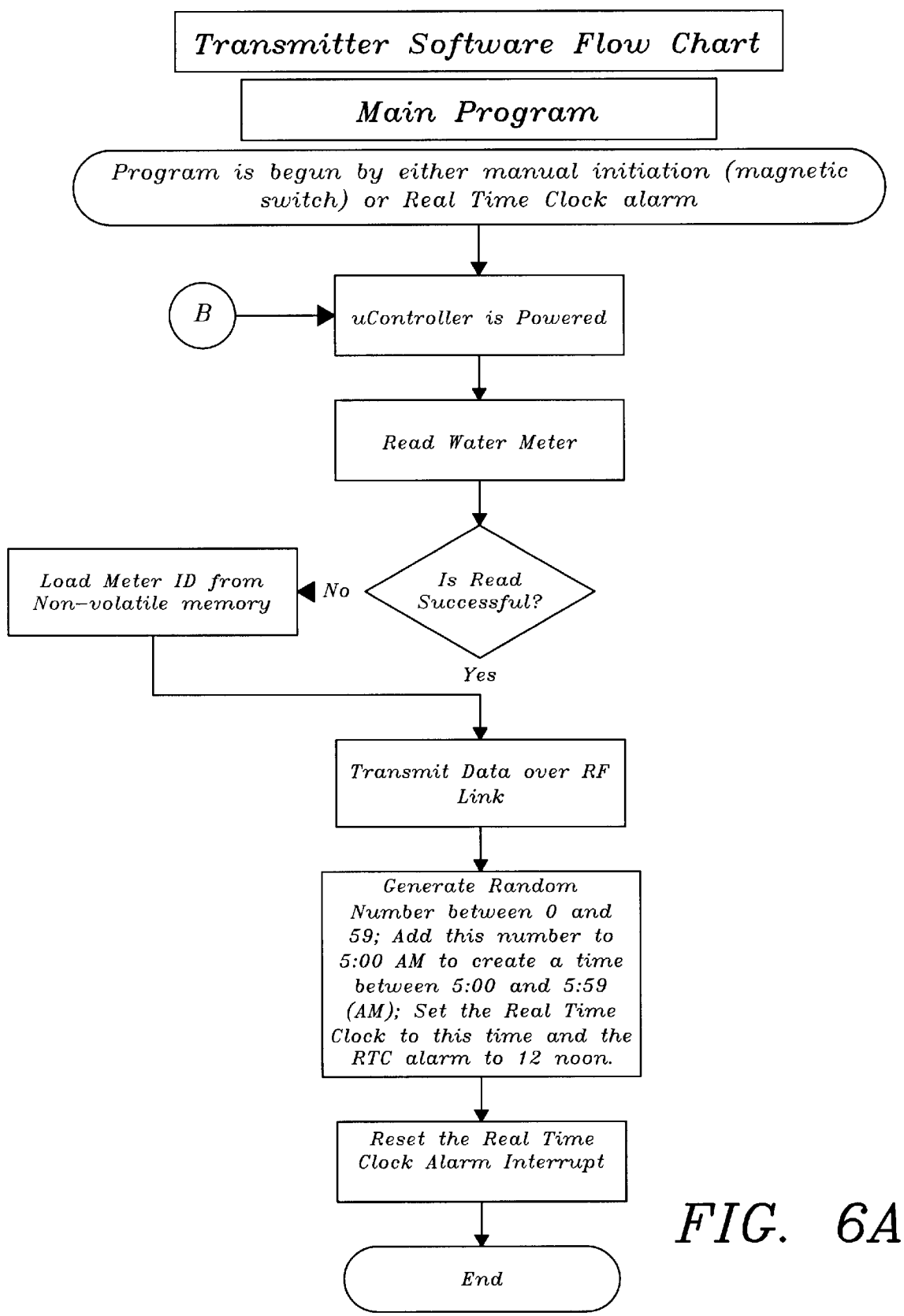
FIG. 6A is a block logic diagram of a main program carried out by a microprocessor of the meter read transmitter device.

Referring to FIG. 6A, a flow diagram is shown representing the main program of transmitter 10. Assuming for now that transmitter 10 has been properly installed and initialized, microcontroller 24 of transmitter 10 is first powered. The powering of microcontroller 24 can be accomplished either through manual initiation (to be discussed in further detail hereinafter) or by real time clock (RTC) 26. Once microcontroller 24 is awake, it pulses meter 16 from RA1, or pin 18, of microcontroller 24 through the optoisolator circuit to the 'R', or clock, line of meter 16. By bringing the clock line high, the meter puts a binary 0 or 1 on the data line; thereafter, the clock line is brought low and the bit on the data line is read. Once a byte (7 bits of data and an eighth parity bit) of data is read and it is determined that the read is successful, the meter read data is outputted to transmitter module 22 from RAO, or pin 17, of microcontroller 24 to data in, or pin 2, of module 22. Immediately thereafter the data is transmitted over the RF link—the 418 MHZ carrier frequency. If the read is unsuccessful, microcontroller 24 will load the meter ID from non-volatile memory (EPROM of RTC 26). At this point, microcontroller 24 will not attempt another read. Instead the meter ID would then be transmitted along with an error code in the form of decimal number "2" for "meter not connected." Decimal number "2" is one of three error codes potentially embedded in a status byte of the transmitted data. Decimal number "2" represents the particular error code for a bad meter read.

The data to be transmitted is a 15 byte data string. Byte 1 is the STX (Start of Text) character; Byte 2 is the Status Code of Meter; Bytes 3–6 are the Meter Value; Bytes 7–14 are the Meter ID; and Byte 15 is the Checksum. However, in order to employ an averaging technique allowed by the FCC (and thereby gain additional allowed power), each byte is encoded into eight bytes, except for Byte 1 (the STX character), which is not encoded. Thus, in actuality 113 bytes are transmitted over the RF link (14×8=112 bytes plus the STX character byte for a total of 113 bytes of transmitted data).

With continuing reference to FIG. 6A, once a successful meter read data has been transmitted, microcontroller 24 generates a random number between 0 (zero) and 59 (fifty-nine). This random number is added to 5:00 am to create a time between 5:00 am and 5:59 am. The RTC 26 clock is then set to this "created time" and the RTC alarm is set to 12 noon. The RTC alarm interrupt line is then reset to high thereby placing a high on the gate of FET Q1 high which results in cutting off power to microcontroller 24. Once power is cut off to microcontroller 24, transmitter 10 waits until the six to approximately seven hour "created time" elapses whereafter the RTC alarm goes off and RTC 26 once again powers-up microcontroller 24 so that another read upon meter 16 can be taken for subsequent transmission over the RF link. The powering down of microcontroller 24 ensures a longer life for the battery used in transmitter 10 of seven to ten years with some results indicating a life potential of fifteen years.

Figure 6B:
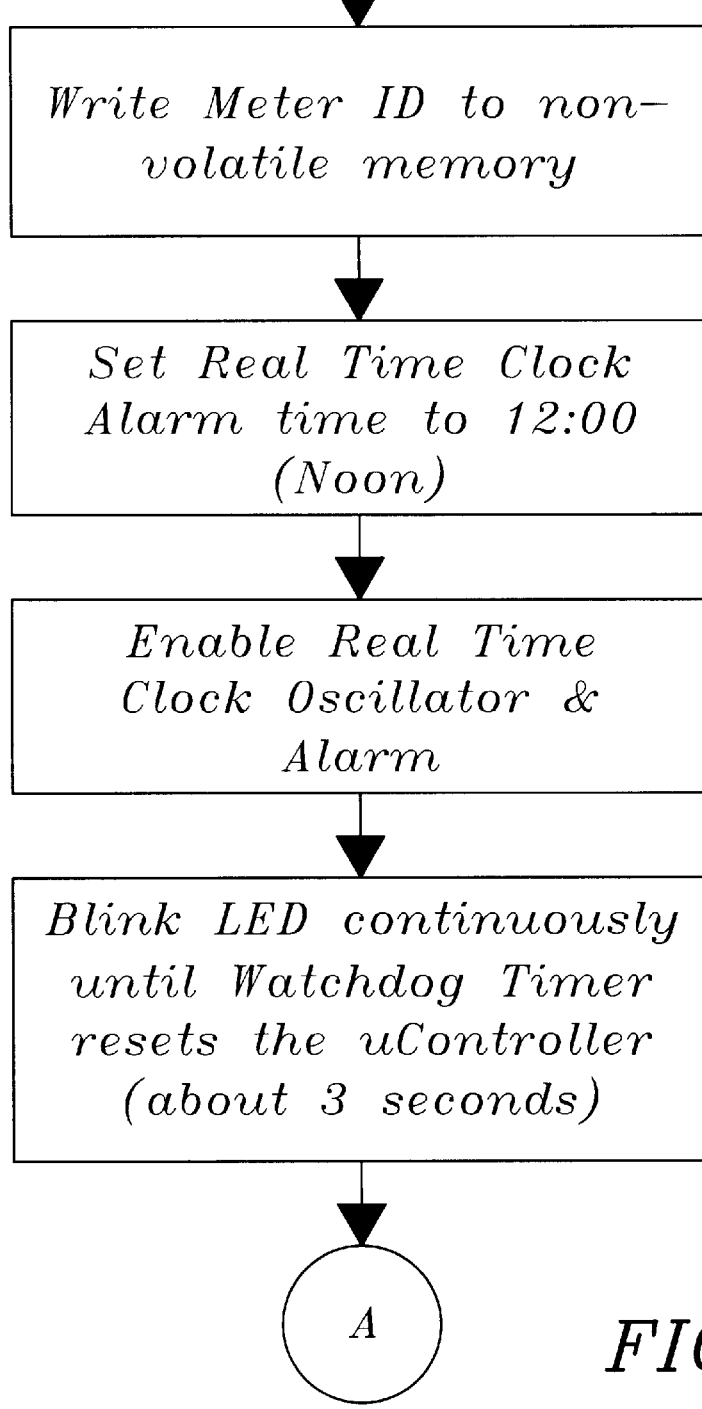
FIG. 6B is a block logic diagram of a manual switch interrupt program carried out by the microprocessor of the meter read transmitter device.

Referring to FIG. 6B, a flow diagram of a sub-program is shown representing the steps used for an initialization procedure or manual operation of transmitter 10. In regards to the initialization procedure, when the system is first installed, each transmitter 10 is coupled to a specific meter and has a unique meter ID burned into non-volatile memory of transmitter 10. Thereafter the transmitter is checked for proper operation. The sub-program of FIG. 6B accomplishes these objectives. A magnetic switch Si (see FIG. 2), coupled to pin 6, or INT0, of RTC 26, is normally an open circuit. By manually placing a magnet thereover, magnetic switch S1 closes causing microprocessor 24 to be powered and the RTC oscillator and alarm to be enabled, causing the LED to blink and microcontroller 24 to read meter 16 and transmit the data as above by the main program of FIG. 6A. If the switch is still closed by the magnet, the main program will jump to the sub-program prior to the main program end and repeat the cycle until the watchdog timer resets microprocessor 24. The result is that the LED will blink for approximately 3 seconds and transmit the meter ID and data read and will repeat as long as the switch is closed and/or the magnet is in place. Once the magnet is removed the main program will end after having set the RTC time and alarm as in the standard mode of transmission. The magnet can also be used to manually transmit the meter data as above in an installation mode.

Figure 7A:
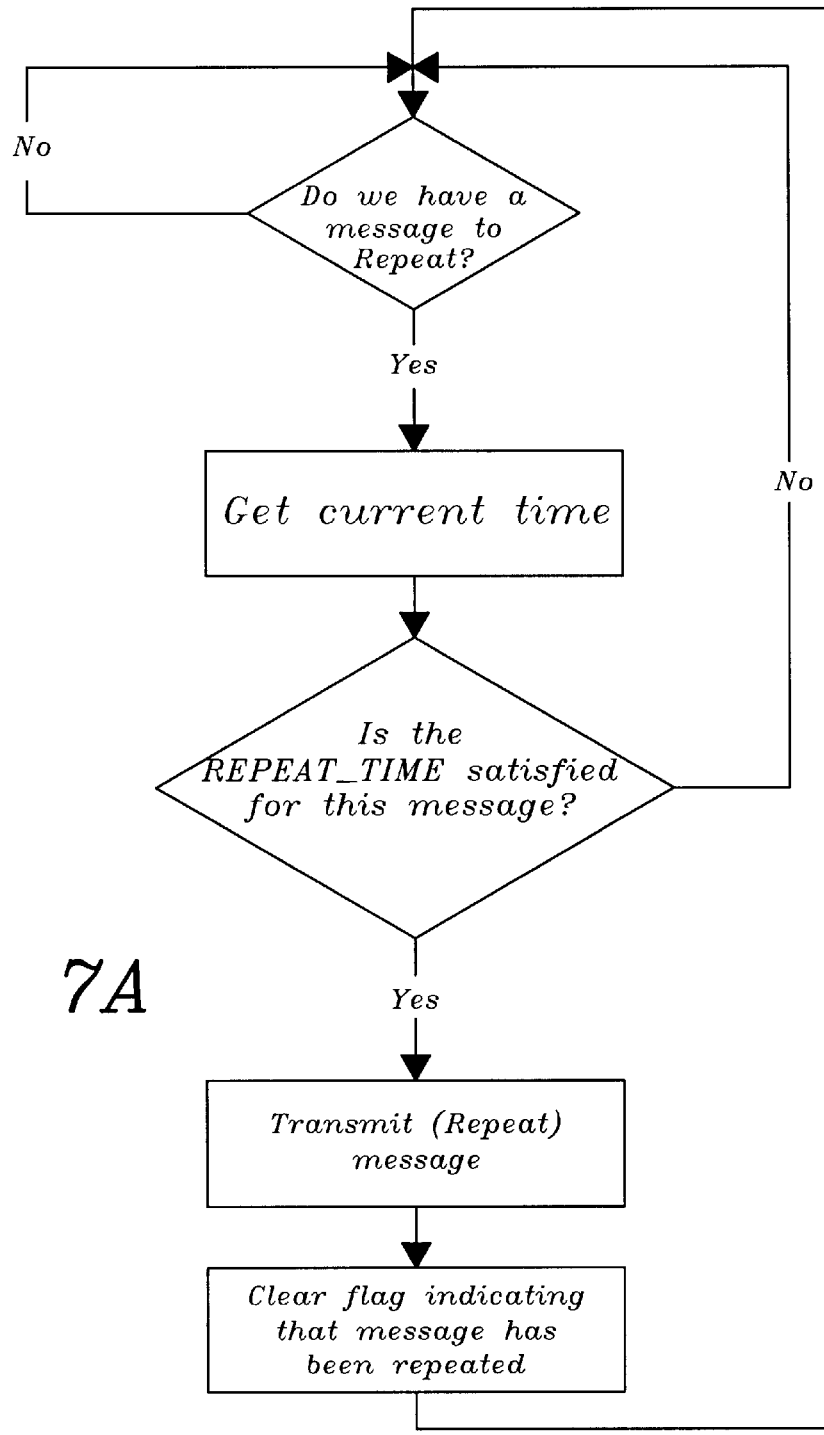
FIG. 7A is a block logic diagram of a main program carried out by a microprocessor of the repeater device.

Referring to FIG. 7A, a flow diagram is shown representing the main program of repeater 12. Assuming a message (meter read data obtained by transmitter 10) has been received by at least one of the transceivers 28 over the RF link and directed to repeater 12 through the Receive Interrupt Routine of FIG. 7B, a query is made asking whether a message needs to be repeated (a flag is set in the interrupt routine indicating that the message needs to be repeated). If no, the program loops around and asks again whether there is a message to repeat. When the answer is yes, repeater 12 reads the current time from its RTC, checks the "repeat time" in seconds (generated in the Receive Interrupt Routine) and compares it to the seconds of the current time. A query is then made asking whether the "repeat time" has been satisfied. If yes (the FCC required 30 seconds has elapsed from a previous transmission and the current time and "repeat time" seconds match for this message), the message is transmitted, or repeated, to collector 14 or another repeater 12. Thereafter, the message's repeat message flag is cleared therefrom, indicating that the message has been repeated. Messages having a cleared flag will not be repeated. It is noted that the same encoding scheme is used as described hereinabove in reference to the data being transmitted from transmitter 10 to repeater 12.

With continuing reference to FIG. 7A, if the "repeat time" is not satisfied, the repeat message flag remains and the message stays in the main program loop until the "repeat time" matches the current time "seconds" wherein it is thereafter transmitted. The "repeat time" represents a random delay of up to one minute and is generated when the message is first received by repeater 12. The random delay is some number between 0 and 59 seconds. This minimizes the possibility of the two repeaters, placed in close proximity of one another, from receiving the same message and repeating it simultaneously, which would most likely result in corrupted transmissions.

Figure 7B:
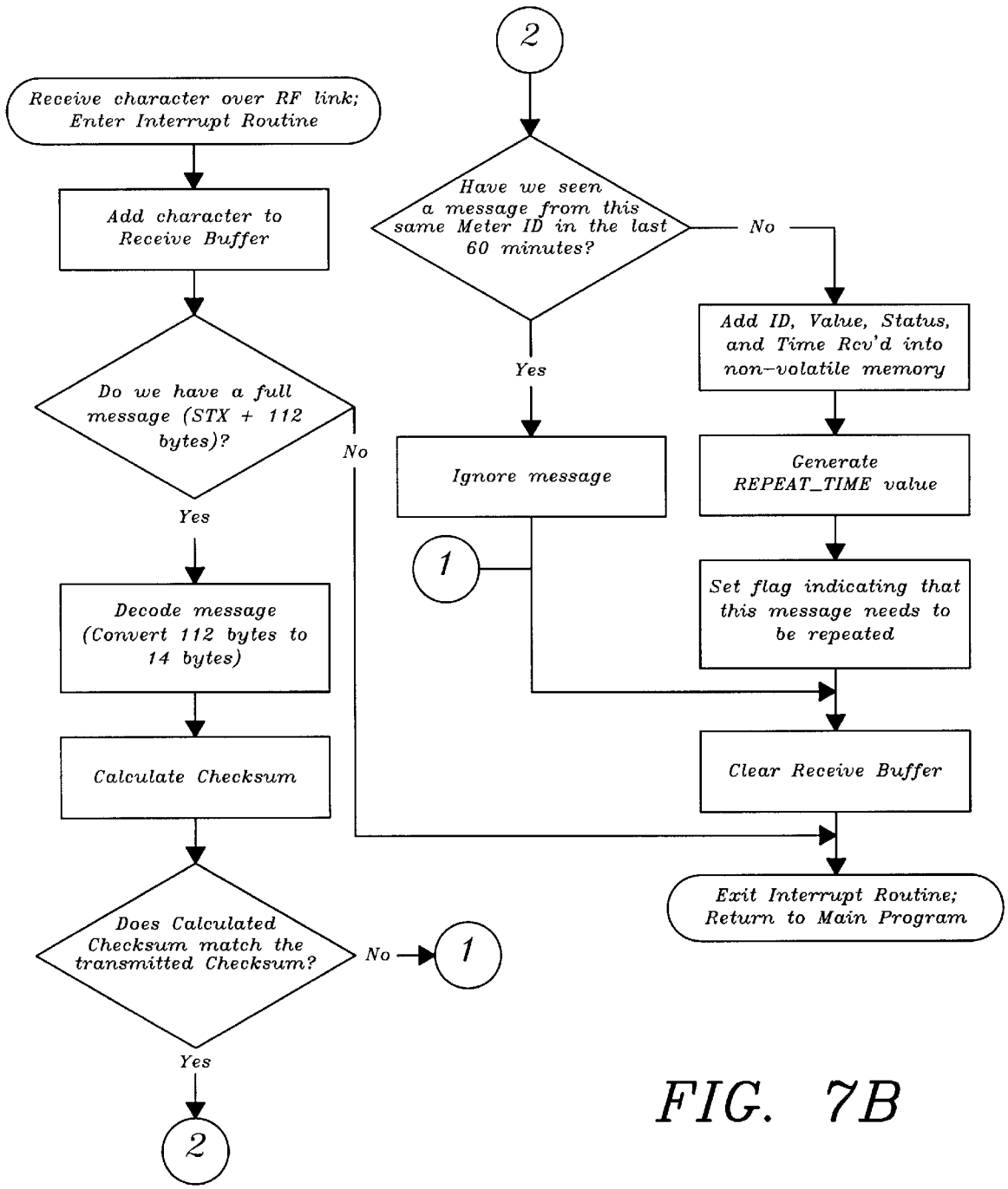
FIG. 7B is a block logic diagram of a receive character interrupt program carried out by the microprocessor of the repeater device.

Referring to FIG. 7B, a flow diagram is shown representing a Receive Interrupt Routine carried out by repeater 12. The Receive Interrupt Routine relates to the steps carried out by repeater 12 as it receives a message directed from one of the plurality of transceivers 28 coupled thereto. When a character is received over the RF link, the Receive Interrupt Routine is entered. First, the character is added to a receive buffer. Next, a query is made asking whether a full message has been received (STX character byte plus 112 bytes). If the message is not a full message, the Receive Interrupt Routine is exited, returning repeater 12 to the main program of FIG. 7A. If a full message has been received, the message is decoded from 113 bytes to 15 bytes (one STX character byte, thirteen bytes of meter data and the Checksum byte). Next, the received Checksum is calculated and matched against the transmitted Checksum. If the two Checksums do not match, the Receive Interrupt Routine moves to a point wherein the receive buffer is cleared and the interrupt routine is exited, returning repeater 12 to the main program of FIG. 7A. If the two Checksums match, a query is made asking whether a message has been received from the same meter in the last sixty (60) minutes. If yes, the message is ignored and the Receive Interrupt Routine moves to the point where the receive buffer is cleared and the interrupt routine is exited, returning repeater 12 to the main program of FIG. 7A. If no, (it's been longer than sixty minutes since a message has been received from the same meter), then the Meter ID, Status Code of Meter, Meter Value and the time the message was received by repeater 12 is added into non-volatile flash memory. Thereafter, the "repeat time" value is generated (see above) and the flag is attached to the message indicating that the message needs to be repeated, or transmitted to collector 14. The receive buffer is then cleared and the interrupt routine is exited, returning repeater 12 to the main program of FIG. 7A.

Figure 8A:
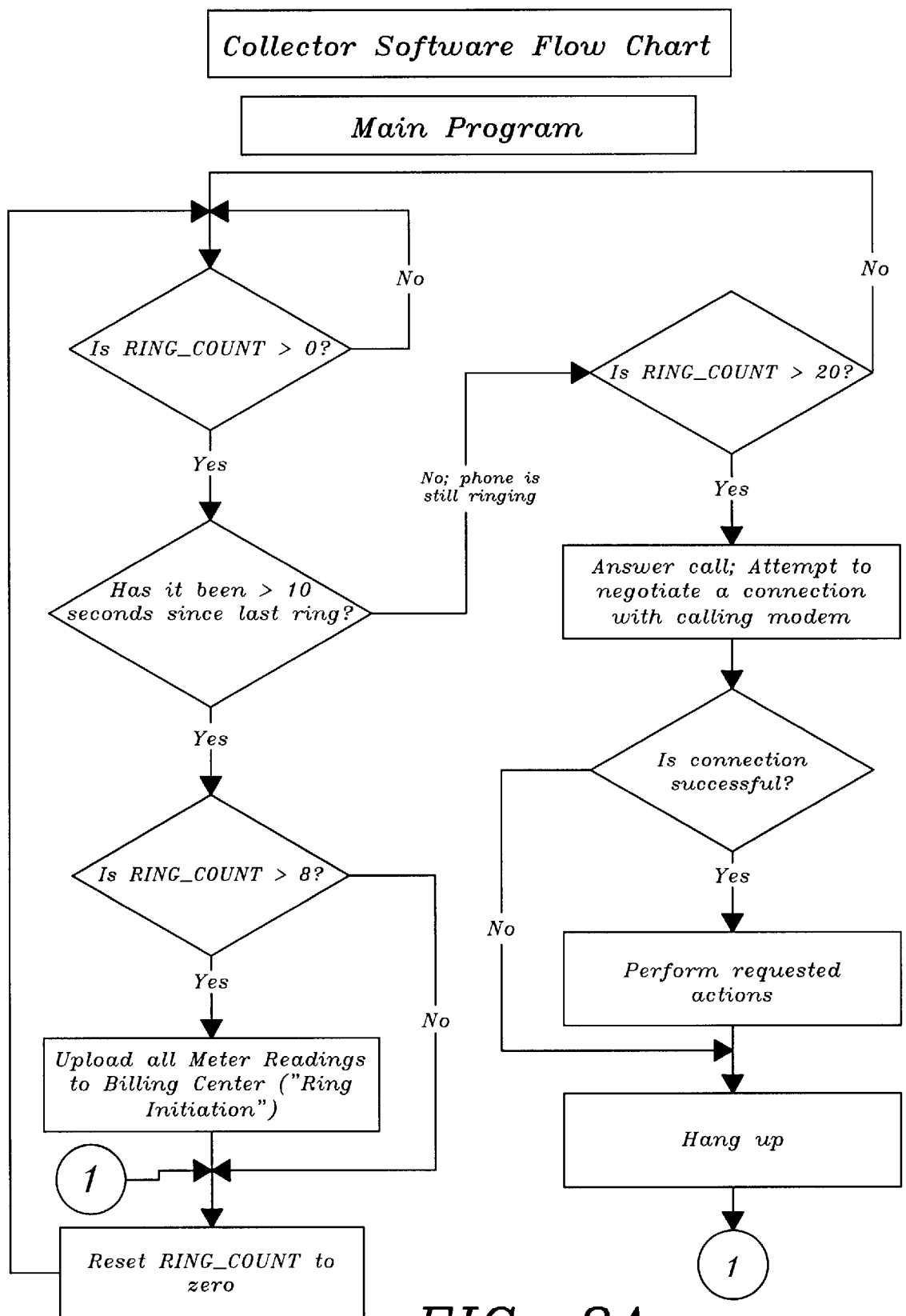
FIG. 8A is a block logic diagram of a main program carried out by a microprocessor of the collector device.
Figure 8B:
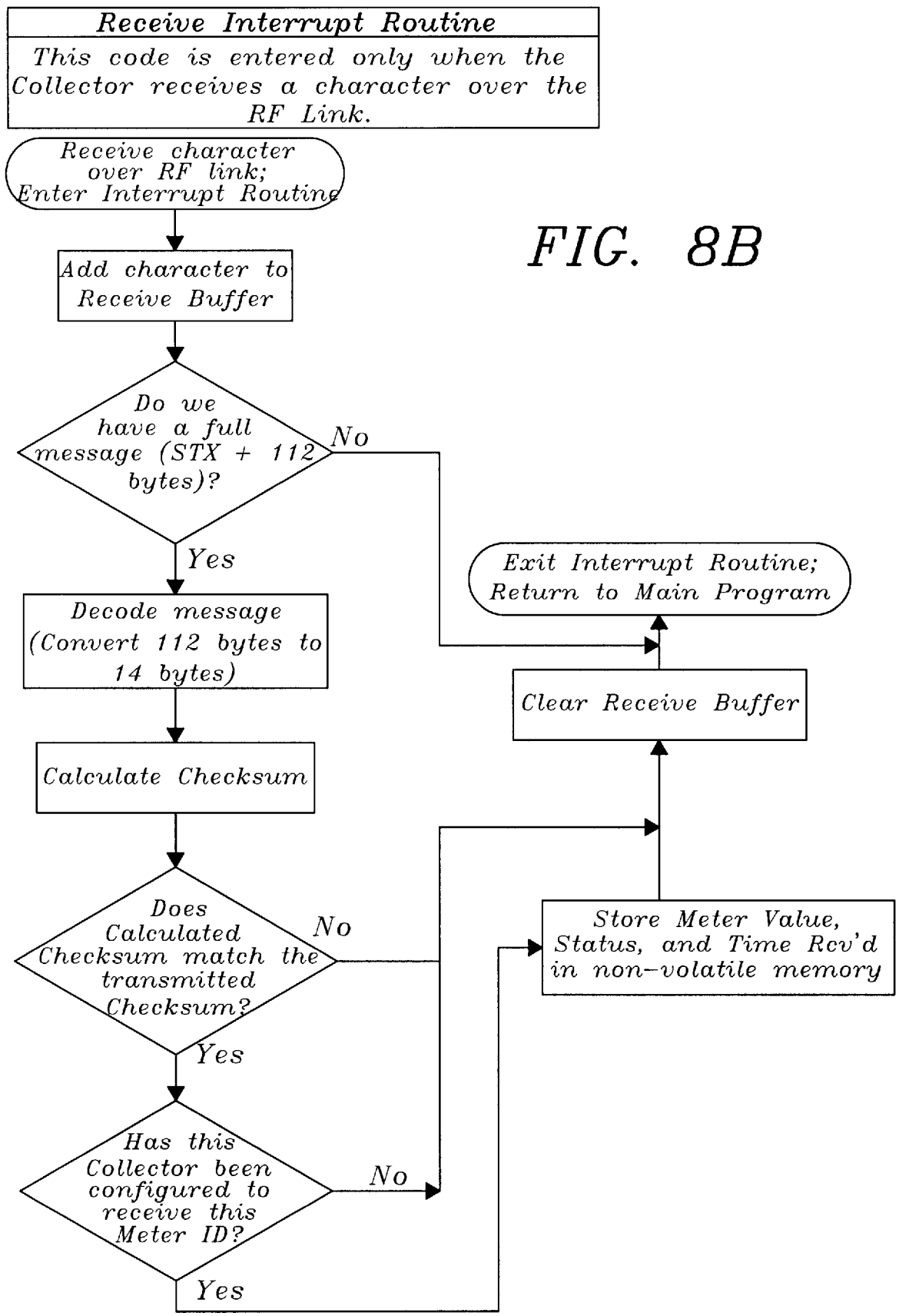
FIG. 8B is a block diagram of a receive character interrupt program carried out by the microprocessor of the collector device.

Referring to FIG. 8B, a flow diagram is shown representing one of two sub-programs carried out by collector 14. In particular, FIG. 8B shows the steps carried out by a Receive Interrupt Routine of collector 14. If a character is received over the RF link by transceiver 28 of collector 14, the Collector Receive Interrupt Routine is entered wherein the character is first added to a receive buffer of collector 14. A query is formed asking whether the message is a full message (STX byte plus 112 bytes). If it is not a full message, the Receive Interrupt Routine is exited, returning collector 14 to the main program of FIG. 8A (to be discussed in full detail hereinafter). If the message is a full message, it is decoded into a 15 byte string or the single STX byte, the thirteen bytes of meter data and the Checksum byte (as discussed above in the transmitted data format of transmitter 10). The Checksum is then calculated and a query is made asking whether the calculated Checksum and transmitted Checksum match. If no, the Receive Interrupt Routine moves to a point where the receive buffer is cleared and the routine is exited thereby returning the program to the main program of FIG. 8A. If the Checksums match, then another query is made asking whether collector 14 has been configured to receive this meter ID (by addressing a look-up table in RAM memory of collector 14). If no (collector 14 is not supposed to receive transmissions from this particular meter), the interrupt routine moves to a point whereby the receive buffer is cleared and the interrupt routine is exited thereby returning to the collector main program of FIG. 8A. If collector 14 is configured to receive messages from the particular meter, the Meter Value and Status Code of Meter is extracted from the 14 byte string and stored in non-volatile flash memory along with the time the message was received which is taken from the RTC in collector 14. Finally, the receive buffer is cleared and the routine in exited to the collector main program of FIG. 8A. It is noted that the most significant bit (MSB) of byte number 2 (the status byte) contains a source flag indicating where this particular message originated from—transmitter 10 or repeater 12. In the preferred embodiment, the MSB is set to '0' for a transmitter message and '1' for a repeater message. It is further noted that the meter configuration query ensures that two or more collectors positioned in close proximity of one another avoid collecting data not intended therefor. For example, the meter configuration query precludes two collectors positioned across the street from each other, in two separate apartment complexes, from receiving data from the other complexes' meters. It is even further noted that in the preferred embodiment, 512K of flash memory is employed permitting 1024 slots in flash memory to be employed for a total permissible allocation of memory space for one reading for 1024 transmitters in one system.

In a preferred method, a central database automatically calls collector 14 via a modem and downloads the collected meter data. In alternate methods, and when it is necessary to perform configuration routines, collector 14 can either interface directly (on-site) with a PC via an RS-232 connection, interface remotely with a PC utilizing a two way connection via a modem or be connected directly to a standard telephone for purposes of "ringing" the collector. As seen in electrical circuit FIGS. 5C–5C.1, data select 76 is employed to distinguish the interfacing unit addressing collector 14 as either an RF signal, a modem connection or a direct RS-232 PC connection. In the preferred embodiment, an SGS Thompson CD4529BE data select chip is employed.

Figure 8C:
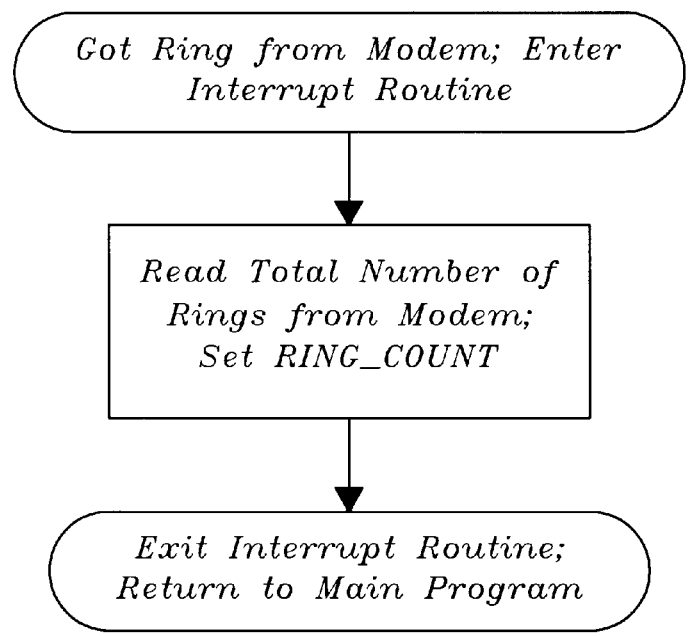
FIG. 8C is a block logic diagram of a modem ring-receive interrupt program carried out by the microprocessor of the collector device.

If microcontroller 24 senses a ring from the modem, the Modem Ring Interrupt Routine is entered, as seen in FIG. 8C. The total number of rings from the modem is read and a "ring count" is set. Thereafter, the Modem Ring Interrupt Routine is exited thereby returning to the main program of FIG. 8A.

Referring to FIG. 8A, the main program of collector 14 is shown. Upon a "ring count" being determined by the Modem Ring Interrupt Routine, a query is made asking whether the "ring count" is greater than zero. If no, the same query is made asking whether the "ring count" is greater than zero. This query continues to loop until the answer becomes yes. Upon the "ring count" being greater than zero, or yes, a second query is made asking whether it has been more than ten seconds since the last ring. If yes (meaning the preprogrammed number of rings has polled collector 14 and the billing center is requesting the meter data), a query is made asking whether the "ring count" is greater than eight. If no (for instance, only five rings have been received), the "ring count" is reset to zero and the main program returns to the point wherein it is asked whether the "ring count" is greater than zero (or in other words, the point where the program is waiting to have a "ring count" set by the Modem Ring Interrupt Routine). If it has been greater than ten seconds since the last ring and the "ring count" is greater than eight (a ring initiation has been determined), collector 14 dials up the billing center using a preprogrammed telephone number, establishes a connection with the billing center and uploads all of its collected meter data. The ring initiation value can be changed to any number desired by the programmer/administrator of the system. Eight rings is used for illustrative purposes but does represent the value used in the preferred method of operation. After uploading all the meter readings, the "ring count" is reset to zero and the main program returns to the point wherein it is waiting to have a "ring count" set by the Modem Ring Interrupt Routine.

With continued reference to FIG. 8A, and at the point of the main program wherein it is asked whether it has been more than ten seconds since the last ring, and the answer is no (the phone is still ringing), a query is made asking whether the "ring count" is greater than twenty. If no, the program returns to the point wherein it is asked whether the "ring count" is greater than zero. If yes ("ring count" is greater than twenty), collector 14 answers the call and attempts to negotiate a connection with the calling modem. This function is primarily used for a two-way connection with a PC to remotely configure the system or to download specific information at the particular point in time of the two-way connection. A query is next made asking whether a successful connection has been established. If no, the collector modem hangs up, the "ring count" is reset to zero and the program returns to the point wherein it is waiting to have a "ring count" set by the Modem Ring Interrupt Routine. If a successful connection has been established, the program performs the requested action being asked by the operator of the PC at the other end of the two-way connection. These actions are initiated by the caller using PC configuration software. Actions include setting the collector's RTC, defining the Upload Call parameters (phone number to call, when to call, etc . . . ) and adding/removing allowed Meter IDs. In addition, the PC configuration software allows the user to download meter readings for any meter and day in the previous two months (or sixty-two days)

Upon completing all the requested actions asked by the PC operator, the collector modem hangs up, the "ring count" is reset to zero and the program returns to the point wherein it is waiting to have a "ring count" set by the Modem Ring Interrupt Routine. As with the ring initiation setting, the two-way connection setting can be changed by the programmer/administrator of the system. The "ring count" greater than twenty for establishing a two-way PC connection is used of illustrative purposes, but does represent the value used in the preferred method of operation. It is also noted that the ring initiation value should be less than the two-way PC connection value.

Equivalent elements and components can be substituted for the ones set forth above to achieve the same results in the same manner. And, equivalent steps can be employed for the ones set forth above to achieve the same results in the same manner.

Having thus described the invention what is claimed and desired to be secured by Letters Patent is:

1. An automatic system for collecting water usage data from a plurality of water meters and uploading the data to a central location, each of the plurality of water meters determining the water usage of a single water consuming unit, each meter having a unique meter ID, the automatic system comprising:
   a) at least one RF transmitter electrically coupled to at least one water meter, the at least one RF transmitter comprising a power source, a first microcontroller, means for generating an RF carrier and means for transmitting the RF carrier, the first microcontroller addressing the at least one water meter, collecting the water usage data stored in the at least one water meter and encoding the water usage data for transmission over the RF carrier; and
   b) an RF collector proximally located to the at least one RF transmitter, the RF collector comprising a power source, a second microcontroller, means for receiving the RF carrier and means for communicating with the central location, the second microcontroller decoding the water usage data transmitted over the RF carrier, confirming that the collector is configured to receive the water usage data associated with a particular meter and storing the data in memory for retrieval by the central location.

2. The system of claim 1, further comprising at least one RF repeater proximally located to the at least one RF transmitter comprising a power source, a third microcontroller and means for receiving and transmitting the RF carrier, the third microcontroller temporarily storing the water usage data from each meter in memory, the at least one RF repeater transmitting the RF carrier once within a predetermined period of time.

3. The system of claim 2, wherein the predetermined period of time is thirty seconds.

4. The system of claim 2, wherein a single RF repeater is employed.

5. The system of claim 4, wherein the means for receiving and transmitting the RF carrier of the RF repeater is a transceiver module comprising an electrical connection to the RF repeater power source, a data interface connecting to the third microcontroller, a first antenna receiving the RF carrier, a first transceiver IC coupled to the first antenna extracting the water usage data from the RF carrier and directing the extracted data to the third microcontroller through the data interface, a second antenna transmitting the RF carrier and a second transceiver IC coupled to the second antenna directing the water usage data to the second antenna from the third microcontroller through the data interface.

6. The system of claim 5, wherein a plurality of transceiver modules are employed.

7. The system of claim 1, the at least one RF transmitter further comprising a real time clock and a manual initiation circuit, the real time clock coupled directly to the first microcontroller, the manual initiation circuit coupled to the first microcontroller through the real time clock, the real time clock controlling the power to the first microcontroller.

8. The system of claim 7, wherein the manual initiation circuit comprises a magnetic switch, a P-channel MOSFET, an RC network, a pull-up resistor and a connection to the power source, the manual initiation circuit coupled to an interrupt line of the real time clock, the manual initiation circuit providing power to the first microcontroller through the real time clock upon the closing of the magnetic switch.

9. The system of claim 7, wherein the real time clock includes a real time clock alarm for randomly providing power to the first microcontroller every six to seven hours.

10. The system of claim 1, wherein the means for generating the RF carrier of the at least one RF transmitter is a transmitter IC coupled to the first microcontroller, the transmitter IC modulating the water usage data on the RF carrier.

11. The system of claim 10, wherein the means for transmitting the RF carrier of the at least one RF transmitter is an antenna coupled to the transmitter IC of the at least one RF transmitter.

12. The system of claim 1, wherein the frequency of the RF carrier is 418 MHZ.

13. The system of claim 1, wherein the water usage data for each particular meter is configured by the first microcontroller as a fifteen byte data string.

14. The system of claim 1, wherein the second microcontroller decodes the one-hundred and thirteen byte data string into a fifteen byte data string for storing in memory.

15. The system of claim 1, the RF collector further comprising non-volatile flash memory, a data select IC and a level translator IC.

16. The system of claim 15, wherein the flash memory stores water usage data for a plurality of water meters for a plurality of days.

17. The system of claim 15, wherein the data select IC determines a mode of communication with the RF collector, the mode of communication comprising a personal computer connection, a modem connection or an RF carrier connection.

18. The system of claim 1, wherein the means for receiving the RF carrier of the RF collector is a transceiver module comprising an electrical connection to the RF collector power source, a data interface connecting to the second microcontroller, an antenna receiving the RF carrier and a transceiver IC coupled to the antenna extracting the water usage data from the RF carrier and directing the extracted data to the second microcontroller through the data interface.

19. The system of claim 1, wherein the means for communicating with the central location of the RF collector is a modem.

20. The system of claim 1, wherein the second microcontroller confirms that the RF collector is configured to receive the water usage data associated with a particular meter by addressing a look-up table in memory and matching a meter ID encoded in the water usage data against a series of meter IDs listed in the look-up table.

21. An automatic RF carrier transmission system for collecting, storing and uploading water usage data from a plurality of water meters to a central location, each of the plurality of water meters determining the water usage of a single water consuming unit, each meter having a unique meter ID, the automatic RF carrier transmission system comprising:
   a) a plurality of RF transmitter modules electrically coupled to the plurality of water meters such that each water meter is coupled to a single RF transmitter module, each RF transmitter module comprising:
      (i) a power source,
      (ii) a first microcontroller addressing the water meter, collecting the water usage data stored in the water meter and encoding the data for transmission over an RF carrier,
      (iii) a transmitter IC coupled to the first microcontroller modulating the water usage data on the RF carrier, and
      (iv) an antenna coupled to the transmitter IC for transmitting the RF carrier;
   b) a collector network proximally located to the plurality of RF transmitter modules comprising a RF collector module and a transceiver module:

(i) the transceiver module comprising a first interface electrically connecting to the RF collector module, an antenna receiving the RF carrier and a transceiver IC coupled to the antenna extracting the water usage data from the RF carrier and directing the extracted data to the RF collector module through the first interface, and (ii) the RF collector module comprising a power source, a second microcontroller decoding the water usage data transmitted over the RF carrier, confirming that the collector network is configured to receive the data associated with a particular meter and storing the data in memory for retrieval by the central location, a second interface electrically connecting to the transceiver module and means for communicating with the central location, the RF collector module power source electrically coupled to the second interface supplying a power source connection to the transceiver module, the second microcontroller electrically coupled to the second interface supplying a data communication link between the second microcontroller and the transceiver module transceiver IC; and c) a repeater network proximally located to the plurality of RF transmitters comprising an RF repeater module and a plurality of transceiver modules, the repeater network transmitting the RF carrier once within a predetermined period of time:

(i) each of the repeater network plurality of transceiver modules comprising a first interface electrically connecting to the RF repeater module, a first antenna receiving the RF carrier, a first transceiver IC coupled to the first antenna extracting the water usage data from the RF carrier and directing the extracted data to the RF repeater module through the repeater network transceiver module first interface, a second antenna transmitting the RF carrier and a second transceiver IC coupled to the second antenna directing the water usage data to the second antenna from the RF repeater module through the repeater network transceiver module first interface, and (ii) the RF repeater module comprising a power source, a third microcontroller temporarily storing the water usage data from each meter in memory and a second interface electrically connecting to the repeater network plurality of transceiver modules, the RF repeater module power source electrically coupled to the RF repeater module second interface supplying a power source connection to the plurality of transceiver modules and the third microcontroller electrically coupled to the RF repeater module second interface supplying a data communication link between the third microcontroller and the first and second transceiver ICs of each of the repeater network plurality of transceiver modules.

22. The system of claim 21, wherein the predetermined period of time is thirty seconds.

23. The system of claim 21, each RF transmitter module further comprising a real time clock and a manual initiation circuit, the real time clock coupled directly to the first microcontroller, the manual initiation circuit coupled to the first microcontroller through the real time clock, the real time clock controlling the power to the first microcontroller.

24. The system of claim 23, wherein the manual initiation circuit comprises a magnetic switch, a P-channel MOSFET, an network, a pull-up resistor and a connection to the power source, the manual initiation circuit coupled to an interrupt line of the real time clock, the manual initiation circuit providing power to the first microcontroller through the real time clock upon the closing of the magnetic switch.

25. The system of claim 23, wherein the real time clock includes a real time clock alarm for randomly providing power to the first microcontroller every six to seven hours.

26. The system of claim 21, wherein the water usage data for each particular meter is configured by the first microcontroller as a fifteen byte data string and then encoded into a one-hundred and thirteen byte data string for modulating over the RF carrier, the third microcontroller decoding the data back into a fifteen byte data string after the repeater network has received the RF carrier and re-encoding the data back into a one-hundred and thirteen byte data string for re-modulating over the RF carrier before the repeater network transmits the RF carrier, and the second microcontroller decoding the one-hundred and thirteen byte data string back into a fifteen byte data string for storing in memory after the RF collector module has received the RF carrier.

27. The system of claim 21, the RF collector module further comprising non-volatile flash memory, a data select IC and a level translator IC, the flash memory storing water usage data for a plurality of water meters for a plurality of days, the data select IC determining a mode of communication with the RF collector comprising a personal computer connection, a modem connection or an RF carrier connection, and the level translator IC providing an RS-232 protocol interface for the personal computer connection.

28. A method for collecting individual water usage data from a plurality of water meters employed within a multi-unit facility and for uploading to a central location, each of the plurality of water meters determining the water usage of a single unit within the multi-unit facility, each meter having a unique meter ID, the steps comprising:

a) coupling a separate RF transmitter to each meter within the multi-unit facility such that each RF transmitter is associated with a unique meter ID, each RF transmitter comprising a power source, a first microcontroller, a real time clock, an RF antenna and means for generating an RF carrier, the real time clock of each RF transmitter comprising a real time clock alarm and a real time clock alarm interrupt line, b) providing an RF collector comprising a power source, a second microcontroller, an RF antenna and means for communicating with the central location, c) powering the first microcontroller of each RF transmitter through each respective real time clock, d) obtaining the water usage data from each meter through the first microcontroller, e) configuring the water usage data of each meter into a fifteen byte data string, f) encoding each fifteen byte data string into a one-hundred and thirteen byte data string, g) generating an RF carrier in each RF transmitter, h) modulating each one-hundred and thirteen byte data string on each RF carrier generated by each RF transmitter, I) transmitting each RF carrier through the antenna of each RF transmitter, j) receiving each transmitted RF carrier by the RF collector through the RF collector antenna, k) extracting each one-hundred and thirteen byte data string from each transmitted RF carrier, l) decoding each one-hundred and thirteen byte string into separate fifteen byte data strings, m) storing a portion of each fifteen byte data string in flash memory of the RF collector along with a time the data was received by the RF collector, n) negotiating a communication with the central location, and o) uploading the water usage data stored in the RF collector flash memory to the central location.

29. The method of claim 28, further comprising the steps of, immediately after transmitting each RF carrier through the antenna of each RF transmitter but before receiving each transmitted RF carrier by the RF collector through the RF collector antenna, the first microcontroller of each RF transmitter, a) generating a random number between zero and fifty-nine, the random number representing minutes, b) adding the random number to the hour of 5:00 am to provide a created time, c) setting the real time clock to the created time, d) setting the real time clock alarm to 12 noon, and e) setting the real time clock alarm interrupt line to an inactive state.

30. The method of claim 28, wherein each RF transmitter further comprises a manual initiation circuit coupled to the real time clock alarm interrupt line, the manual initiation circuit comprising a magnetic switch, a P-channel MOSFET, an network, a pull-up resistor and a connection to the RF transmitter power source, the manual initiation circuit capable of performing a manual interrupt routine on an RF transmitter for powering up the microcontroller, for obtaining the water usage data, for configuring the data, for encoding the data, for generating an RF carrier, for modulating the data on the carrier and for transmitting the carrier, the steps of the manual interrupt routine comprising:

a) placing and holding a magnet directly over the magnetic switch of an RF transmitter, b) writing the meter ID to memory, c) setting the real time clock alarm to 12 noon, d) enabling the real time clock, e) powering the first microcontroller, and f) removing the magnet from the magnetic switch.

31. The method of claim 28, further comprising the steps of, immediately after the RF collector decoding each one-hundred and thirteen byte string into separate fifteen byte strings but before the RF collector storing a portion of each fifteen byte data string in flash memory:

a) calculating a checksum of the fifteen byte data string, b) matching the calculated checksum against a transmitted checksum confirming that the received water usage data is the same as the transmitted data, and c) confirming that the RF collector is configured to receive the water usage data associated with a particular meter ID.

32. The method of claim 28, wherein the fifteen byte data string is configured such that byte 1 is a start of text, byte 2 is a status code of the meter, bytes 3 through 6 are a meter value, bytes 7 through 14 are the meter ID and byte 15 is a checksum.

33. The method of claim 32, wherein the portion of each fifteen byte data string stored in the RF collector flash memory includes the single status code of meter byte and the four meter value bytes.

34. The method of claim 28, wherein the step of negotiating a communication with the central location comprises the steps of:

a) recognizing that a communication with the RF collector is being attempted by sensing a ring at a modem coupled to the collector, b) counting a total number of rings read by the modem, c) setting a ring count based on the total number of rings read by the modem, d) determining that the ring count exceeds a first threshold number of rings, e) determining that a threshold number of seconds have elapsed since a last ring, f) determining that the ring count exceeds a second threshold number of rings, and g) establishing a data communication link.

35. The method of claim 28, wherein the step of negotiating a communication with the central location comprises the steps of:

a) recognizing that a communication with the RF collector is being attempted by sensing a ring at a modem coupled to the collector, b) counting a total number of rings read by the modem, c) setting a ring count based on the total number of rings read by the modem, d) determining that the ring count exceeds a first threshold number of rings, e) determining that a threshold number of seconds have not elapsed since a last ring, f) determining that the ring count exceeds a third threshold number of rings, and g) establishing a data communication link.

36. A method for collecting individual water usage data from a plurality of water meters employed within a multi-unit facility and for uploading to a central location, each of the plurality of water meters determining the water usage of a single unit within the multi-unit facility, each meter having a unique meter ID, the steps comprising:

a) coupling a separate RF transmitter to each meter within the multi-unit facility such that each RF transmitter is associated with a unique meter ID, each RF transmitter comprising a power source, a first microcontroller, a real time clock, an RF antenna and means for generating an RF carrier, the real time clock of each RF transmitter comprising a real time clock alarm and a real time clock alarm interrupt line, b) providing an RF collector comprising a power source, a second microcontroller, an RF antenna and means for communicating with the central location, c) providing an RF repeater comprising a power source, a third microcontroller and at least one RF antenna, d) powering the first microcontroller of each RF transmitter through each respective real time clock, e) obtaining the water usage data from each meter through the first microcontroller, f) configuring the water usage data of each meter into a fifteen byte data string, g) encoding each fifteen byte data string into a one-hundred and thirteen byte data string, h) generating an RF carrier in each RF transmitter, I) modulating each one-hundred and thirteen byte data string on each RF carrier generated by each RF transmitter, j) transmitting each RF carrier through the antenna of each RF transmitter, k) receiving each transmitted RF carrier by the RF repeater through the at least one antenna, l) extracting each one-hundred and thirteen byte data string from each transmitted RF carrier, m) decoding each one-hundred and thirteen byte string into separate fifteen byte data strings, n) storing a portion of each fifteen byte data string in flash memory of the RF repeater, along with the time the data was received by the RF repeater, o) generating a repeat time value between one and sixty, the repeat time value representing a number in seconds, p) associating each data string with its own repeat time value, q) setting a flag to each data string indicating that the data string needs to be transmitted, r) determining a current time, s) directing the flagged data string for transmission by the repeater whose repeat time value matches the current time and where at least thirty seconds have elapsed since the last data string was transmitted, t) clearing the flag from the data string directed for transmission, u) configuring the data string to be transmitted into a fifteen byte data string, v) encoding the fifteen byte data string into a one-hundred and thirteen byte data string, w) generating an RF carrier in the RF repeater, x) modulating the one-hundred and thirteen byte data string on the RF carrier generated by the RF repeater, y) transmitting the RF carrier through the at least one antenna of the RF repeater, z) receiving the RF carrier by the RF collector through the RF collector antenna, aa) extracting the one-hundred and thirteen byte data string from the transmitted RF carrier, bb) decoding each one-hundred and thirteen byte string into separate fifteen byte data strings, cc) storing a portion of each fifteen byte data string in flash memory of the RF collector, dd) negotiating a communication with the central location, and ee) uploading the water usage data stored in the RF collector flash memory to the central location.

37. The method of claim 36, further comprising the steps of, immediately after transmitting each RF carrier through the antenna of each RF transmitter but before receiving each transmitted RF carrier by the RF repeater through the at least one antenna, the first microcontroller of each RF transmitter, a) generating a random number between zero and fifty-nine, the random number representing minutes, b) adding the random number to the hour of 5:00 am to provide a created time, c) setting the real time clock to the created time, d) setting the real time clock alarm to 12 noon, and e) setting the real time clock alarm interrupt line to an inactive state.

38. The method of claim 36, wherein the step of negotiating a communication with the central location comprises the steps of:

a) recognizing that a communication with the RF collector is being attempted by sensing a ring at a modem coupled to the RF collector, b) counting a total number of rings read by the modem, c) setting a ring count based on the total number of rings read by the modem, d) determining that the ring count exceeds zero rings, e) determining that ten seconds have elapsed since a last ring, f) determining that the ring count exceeds eight rings, and g) establishing a data transferring link.

* * * * *

UNITED STATES PATENT AND TRADEMARK OFFICE
CERTIFICATE OF CORRECTION

PATENT NO.   : 6,351,223 B1
DATED        : February 26, 2002
INVENTOR(S)  : Andrew W. DeWeerd, Christopher J. May and Steven C. Tilka It is certified that error appears in the above-identified patent and that said Letters Patent is hereby corrected as shown below:

Column 13,
Line 17, replace "over the RF carrier; and" with -- over the RF carrier, the first microcontroller encoding the collected water usage data into a one-hundred and thirteen byte data string for modulation over the RF carrier; and --.

Column 15,
Line 66, replace "an network" with -- an RC network --.

Column 17,
Line 27, replace "an network" with -- an RC network --.

Signed and Sealed this

Thirteenth Day of August, 2002

Attest:

Attesting Officer

JAMES E. ROGAN
Director of the United States Patent and Trademark Office